(12) United States Patent
Kato

(10) Patent No.: US 7,640,499 B2
(45) Date of Patent: Dec. 29, 2009

(54) EDITING OBJECTS CONTAINED IN DIFFERENT PAGES OF A BUSINESS FORM VIA A "POSITION ADJUSTMENT" OPERATION OR A "COPY" OPERATION

(75) Inventor: Yutaka Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 712 days.

(21) Appl. No.: 11/470,671

(22) Filed: Sep. 7, 2006

(65) Prior Publication Data

US 2007/0061716 A1    Mar. 15, 2007

(30) Foreign Application Priority Data

Sep. 13, 2005    (JP) .............................. 2005-265938

(51) Int. Cl.
*G06F 17/00*    (2006.01)
(52) U.S. Cl. ..................... 715/272; 715/255; 715/247; 715/273; 715/200
(58) Field of Classification Search .................. 715/272, 715/255, 256
See application file for complete search history.

(56) References Cited

U.S. PATENT DOCUMENTS

| | | | | |
|---|---|---|---|---|
| 5,051,930 | A * | 9/1991 | Kuwabara et al. ............ | 715/207 |
| 6,006,242 | A * | 12/1999 | Poole et al. .................. | 715/209 |
| 6,025,841 | A * | 2/2000 | Finkelstein et al. ......... | 715/803 |
| 6,088,711 | A * | 7/2000 | Fein et al. .................... | 715/269 |
| 6,202,073 | B1 * | 3/2001 | Takahashi .................... | 715/204 |
| 6,247,066 | B1 * | 6/2001 | Tanaka ........................ | 719/320 |
| 7,168,037 | B2 * | 1/2007 | Shade et al. ................. | 715/244 |
| 7,385,725 | B1 * | 6/2008 | Sawyer ....................... | 358/1.18 |
| 7,594,171 | B2 * | 9/2009 | Menninga .................... | 715/245 |
| 2003/0056180 | A1 * | 3/2003 | Mori .......................... | 715/530 |
| 2003/0079177 | A1 * | 4/2003 | Brintzenhofe et al. ....... | 715/500 |
| 2005/0094206 | A1 * | 5/2005 | Tonisson .................... | 358/1.18 |
| 2005/0264651 | A1 * | 12/2005 | Saishu et al. ................. | 348/51 |
| 2006/0015804 | A1 * | 1/2006 | Barton et al. ............... | 715/503 |
| 2007/0273845 | A1 * | 11/2007 | Birmingham ............... | 353/101 |
| 2008/0072141 | A1 * | 3/2008 | Hodel-Widmer ........... | 715/255 |

FOREIGN PATENT DOCUMENTS

JP        5-282416      10/1993

* cited by examiner

*Primary Examiner*—Doug Hutton
*Assistant Examiner*—Mustafa Amin
(74) *Attorney, Agent, or Firm*—Cowan, Liebowitz & Latman, P.C.

(57) ABSTRACT

Computer software that facilitates the editing of a form by allowing a user to select a component in a first page of the form and simultaneously align/position other components in other multiple pages of the form in accordance with the alignment/positioning of the selected component in the first page. Also, editing of the form is facilitated by allowing the user to select a component in a first page of the form, copy the selected component and simultaneously paste the selected component on other multiple pages of the form in accordance with the alignment/positioning of the selected component in the first page.

21 Claims, 38 Drawing Sheets

FIG. 8A

| PAGE | FIGURE ID | X-COORDINATE | Y-COORDINATE | WIDTH | HEIGHT | SELECTION FLAG |
|---|---|---|---|---|---|---|
| 1 | TITLE 1 | 10 | 5 | 10 | 5 | OFF |
| 1 | TEXT 1 | 10 | 15 | 10 | 5 | OFF |
| 1 | TEXT 2 | 10 | 25 | 10 | 5 | OFF |
| 1 | TABLE DATA 1 | 10 | 35 | 30 | 20 | OFF |
| 2 | TITLE 2 | 10 | 5 | 10 | 5 | OFF |
| 2 | TABLE DATA 2 | 10 | 35 | 30 | 20 | OFF |
| 3 | TITLE 3 | 15 | 2 | 10 | 5 | OFF |
| 3 | TEXT 3 | 15 | 15 | 10 | 5 | OFF |

FIG. 8B

| PAGE | FIGURE ID | X-COORDINATE | Y-COORDINATE | SELECTION FLAG |
|---|---|---|---|---|
| 1 | TITLE 1 | 45 | 5 | OFF |
| 1 | TEXT 1 | 45 | 15 | OFF |
| 1 | TEXT 2 | 45 | 25 | OFF |
| 1 | TABLE DATA 1 | 45 | 35 | OFF |
| 2 | TITLE 2 | 55 | 5 | OFF |
| 2 | TABLE DATA 2 | 55 | 35 | OFF |
| 3 | TITLE 3 | 65 | 2 | OFF |
| 3 | TEXT 3 | 65 | 15 | OFF |

FIG. 8C

| PAGE | FIGURE ID | X-COORDINATE | Y-COORDINATE | SELECTION FLAG |
|---|---|---|---|---|
| 1 | TITLE 1 | 10 | 65 | OFF |
| 1 | TEXT 1 | 10 | 65 | OFF |
| 1 | TEXT 2 | 10 | 65 | OFF |
| 1 | TABLE DATA 1 | 10 | 65 | OFF |
| 2 | TITLE 2 | 10 | 75 | OFF |
| 2 | TABLE DATA 2 | 10 | 75 | OFF |
| 3 | TITLE 3 | 15 | 85 | OFF |
| 3 | TEXT 3 | 15 | 85 | OFF |

FIG. 9A

| PAGE | FIGURE ID | X-COORDINATE | Y-COORDINATE | WIDTH | HEIGHT | SELECTION FLAG |
|---|---|---|---|---|---|---|
| 1 | TITLE 1 | 10 | 5 | 10 | 5 | ON |
| 1 | TEXT 1 | 10 | 15 | 10 | 5 | OFF |
| 1 | TEXT 2 | 10 | 25 | 10 | 5 | OFF |
| 1 | TABLE DATA 1 | 10 | 35 | 30 | 20 | OFF |
| 2 | TITLE 2 | 10 | 5 | 10 | 5 | OFF |
| 2 | TABLE DATA 2 | 10 | 35 | 30 | 20 | OFF |
| 3 | TITLE 3 | 15 | 2 | 10 | 5 | ON |
| 3 | TEXT 3 | 15 | 15 | 10 | 5 | OFF |

FIG. 9B

| PAGE | FIGURE ID | X-COORDINATE | Y-COORDINATE | SELECTION FLAG |
|---|---|---|---|---|
| 1 | TITLE 1 | 45 | 5 | ON |
| 1 | TEXT 1 | 45 | 15 | OFF |
| 1 | TEXT 2 | 45 | 25 | OFF |
| 1 | TABLE DATA 1 | 45 | 35 | OFF |
| 2 | TITLE 2 | 55 | 5 | OFF |
| 2 | TABLE DATA 2 | 55 | 35 | OFF |
| 3 | TITLE 3 | 65 | 2 | ON |
| 3 | TEXT 3 | 65 | 15 | OFF |

| PAGE | FIGURE ID | X-COORDINATE | Y-COORDINATE | SELECTION FLAG |
|---|---|---|---|---|
| 1 | TITLE 1 | 10 | 65 | ON |
| 1 | TEXT 1 | 10 | 65 | OFF |
| 1 | TEXT 2 | 10 | 65 | OFF |
| 1 | TABLE DATA 1 | 10 | 65 | OFF |
| 2 | TITLE 2 | 10 | 75 | OFF |
| 2 | TABLE DATA 2 | 10 | 75 | OFF |
| 3 | TITLE 3 | 15 | 85 | ON |
| 3 | TEXT 3 | 15 | 85 | OFF |

FIG. 10

| COMMAND NAME | VALID / INVALID |
|---|---|
| TOP ALIGNMENT | INVALID |
| BOTTOM ALIGNMENT | INVALID |

1011 1012

1001

F I G. 13A

| PAGE | FIGURE ID | X-COORDINATE | Y-COORDINATE | WIDTH | HEIGHT | SELECTION FLAG |
|---|---|---|---|---|---|---|
| 1 | TITLE 1 | 10 | 5 | 10 | 5 | ON |
| 1 | TEXT 1 | 10 | 15 | 10 | 5 | OFF |
| 1 | TEXT 2 | 10 | 25 | 10 | 5 | OFF |
| 1 | TABLE DATA 1 | 10 | 35 | 30 | 20 | OFF |
| 2 | TITLE 2 | 10 | 5 | 10 | 5 | OFF |
| 2 | TABLE DATA 2 | 10 | 35 | 30 | 20 | OFF |
| 3 | TITLE 3 | 15 | 5 | 10 | 5 | ON |
| 3 | TEXT 3 | 15 | 15 | 10 | 5 | OFF |

| PAGE | FIGURE ID | X-COORDINATE | Y-COORDINATE | SELECTION FLAG |
|---|---|---|---|---|
| 1 | TITLE 1 | 45 | 5 | ON |
| 1 | TEXT 1 | 45 | 15 | OFF |
| 1 | TEXT 2 | 45 | 25 | OFF |
| 1 | TABLE DATA 1 | 45 | 35 | OFF |
| 2 | TITLE 2 | 55 | 5 | OFF |
| 2 | TABLE DATA 2 | 55 | 35 | OFF |
| 3 | TITLE 3 | 65 | 5 | ON |
| 3 | TEXT 3 | 65 | 15 | OFF |

| PAGE | FIGURE ID | X-COORDINATE | Y-COORDINATE | SELECTION FLAG |
|---|---|---|---|---|
| 1 | TITLE 1 | 10 | 65 | ON |
| 1 | TEXT 1 | 10 | 65 | OFF |
| 1 | TEXT 2 | 10 | 65 | OFF |
| 1 | TABLE DATA 1 | 10 | 65 | OFF |
| 2 | TITLE 2 | 10 | 75 | OFF |
| 2 | TABLE DATA 2 | 10 | 75 | OFF |
| 3 | TITLE 3 | 10 | 85 | ON |
| 3 | TEXT 3 | 15 | 85 | OFF |

~1302c

F I G. 14B
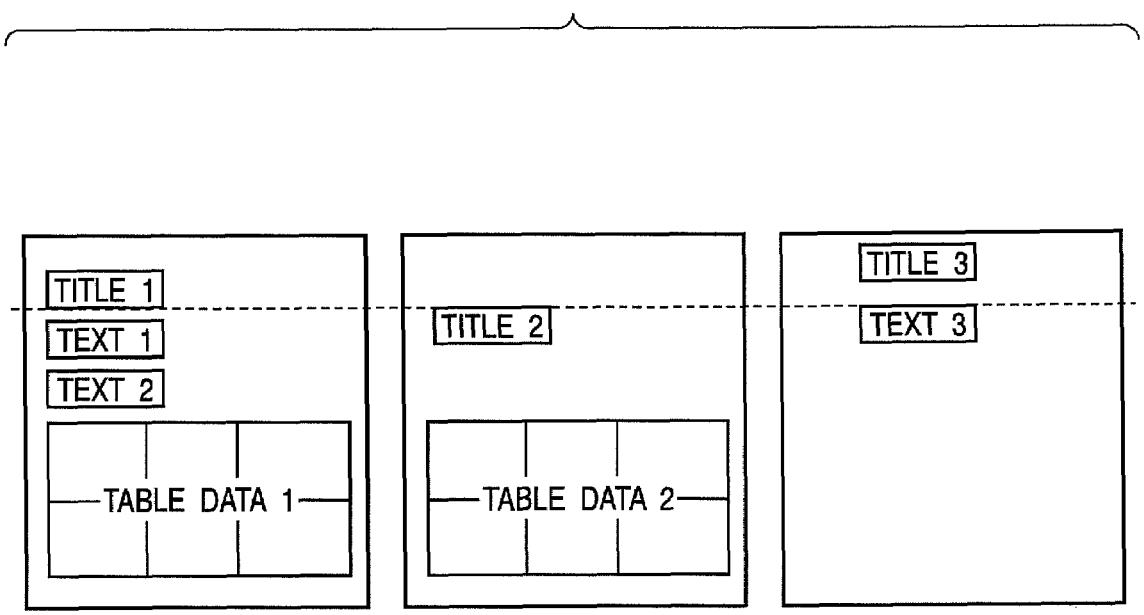

EDITING OBJECTS CONTAINED IN DIFFERENT PAGES OF A BUSINESS FORM VIA A "POSITION ADJUSTMENT" OPERATION OR A "COPY" OPERATION

BACKGROUND OF THE INVENTION

1. Field of the Invention

The present invention relates to a text editing method and apparatus for editing multiple page document data which can be edited in increments of one object which are contained in each page.

2. Description of the Related Art

Most of electronic documents used in offices, shops, and the like are formed from a plurality of pages. For example, the business form of presentation materials at a meeting, accounts, or the like has a plurality of pages in most cases. In order to edit a document having a plurality of pages, the operator executes an application program or the like capable of editing the document. The operator displays a page to be edited on the display by, for example, operating the cursor key or clicking a specific icon (e.g., page turning) in accordance with predetermined operation procedures of the program. Then, the operator performs editing work such as a change of a figure or correction of the text in the displayed target page, and thereby edits the target part in accordance with the operation.

The editing operation includes movement or copying of an object (e.g., a figure) present in a given page to another page. Such editing operation targeting a plurality of pages includes (1) display of a moving (copy) source page, and (2) cutting (or copying) of a figure to be moved (copied). Another editing operation includes (3) display of a moving (copy) destination page, and (4) paste of a figure to be moved (copied) (see, e.g., Japanese Patent Laid-Open No. 5-282416).

When editing each page, the operator displays one page and edits it by a predetermined operation. The operator repeats this operation for each of pages. This editing procedure is employed in, e.g., Microsoft Power Point.

According to the prior art, when editing a document of a plurality of pages, the operator must display all pages to be edited one by one and edit the displayed pages. For examples the editing operation is to move dispersed objects existing in a plurality of pages to one page and combine them, or to copy an object contained in one page to a plurality of pages. The operator must perform an editing operation associated with one copy source (or moving source) page and a plurality of copy destination (or moving destination) pages while switching the display between one copy source (or moving source) page and a plurality of copy destination (or moving destination) pages. This decreases the working efficiency and productivity, and inevitably causes edit errors by an operation error because pages are manually edited one by one. The same problems occur in a case where the editing operation targets a plurality of copy source (or moving source) pages and one copy destination (or moving destination) page.

The same problems also arise when editing objects present in a plurality of pages. For example, to accurately align figures A, B, and C respectively laid out in pages 1, 2, and 3 when editing a 3-page document, the user must adjust the coordinates of figures A, B, and C to the same value while switching between the pages. In most cases, the coordinates of a figure are set by, e.g., inputting numerical values into a dialog box, which is very cumbersome work. Similarly, the user must input numerical values in simultaneously moving figures while keeping the positional relationship of figures between pages. This work puts a heavy burden on the user.

The business form includes a continuous business form having a series of similar business form pages. An example of the continuous business form is a three-page business form in which fields (areas in which data are located) contained in respective pages do not always match each other. For example, the first page of the continuous business form has three fields for inputting the name, age, and address. The second page of the continuous business form has two fields for inputting the name and address. The third page of the continuous business form has two fields for inputting the name and age. In the continuous business form, respective pages contain similar fields. In creating fields, the user edits fields page by page, the field size and field layout position change between pages, resulting in a poor appearance.

As described above, the productivity decreases in editing a plurality of pages because editing processing proceeds while switching between the pages. Further, when editing a plurality of pages and performing common editing operations such as movement, copying, and alignment of objects for the respective pages, the user must edit the pages one by one. Hence, the operability decreases as the number of pages to be edited increases.

SUMMARY OF THE INVENTION

The present invention has been made in consideration of the conventional situation, and has as its object to provide a text editing method and apparatus capable of improving operability in editing an electronic document file having a plurality of pages.

The present invention has been made in consideration of the conventional situation, and has the following arrangement according to the first aspect. That is, a text editing apparatus which edits document data of pages containing objects, comprises a display unit adapted to display, on a display, a user interface window including a preview image of a page selected from the document data, and for a plurality of pages contained in the document data, at least one type of a plurality of horizontally projected images obtained by projecting objects contained in the respective pages in a horizontal direction of the pages, and a plurality of vertically projected images obtained by projecting the objects in a vertical direction of the pages; a selection unit adapted to select one or a plurality of horizontally projected images or vertically projected images displayed by the display unit, and thereby selecting objects corresponding to the selected projected images; and an editing processing unit adapted to execute editing processing for the selected objects in the user interface window, wherein the editing processing unit executes the editing processing for an object which is contained in a page different from a page of the preview image while displaying the preview image.

According to the second aspect, the present invention has the following steps. That is, a text editing method of editing document data of pages containing objects, comprises a display step of displaying, on a display unit, a user interface window including a preview image of a page selected from the document data, and for a plurality of pages contained in the document data, at least one type of a plurality of horizontally projected images obtained by projecting objects contained in the respective pages in a horizontal direction of the pages, and a plurality of vertically projected images obtained by projecting the objects in a vertical direction of the pages; a selection step of selecting one or a plurality of horizontally projected images or vertically projected images displayed in the display step, and thereby selecting objects corresponding to the selected projected images; and an editing processing step of executing editing processing for the selected objects in the user interface window, wherein in the editing processing step, the editing processing is executed for an object contained in a page different from a page of the preview image while displaying the preview image.

Further features of the present invention will become apparent from the following description of exemplary embodiments (with reference to the attached drawings).

BRIEF DESCRIPTION OF THE DRAWINGS

FIG. 8A is a table showing an example of a main pane-information storage table;

FIG. 8B is a table showing an example of a horizontal projection pane-information storage table;

FIG. 8C is a table showing an example of a vertical projection pane-information storage table;

FIG. 9A is a table showing another example of the main pane-information storage table;

FIG. 9B is a table showing another example of the horizontal projection pane-information storage table;

FIG. 9C is a table showing another example of the vertical projection pane-information storage table;

FIG. 10 is a table showing an example of a command valid/invalid information storage table;

FIG. 13A is a table showing an example of the main pane-information storage table in FIG. 7;

FIG. 13B is a table showing an example of the horizontal projection pane-information storage table in FIG. 7;

FIG. 13C is a table showing an example of the vertical projection pane-information storage table in FIG. 7;

FIG. 14B is a view showing an example of the processing result of vertical alignment;

DESCRIPTION OF THE EMBODIMENT

First Embodiment

<Configuration of Word Processing System>

Figure 1:
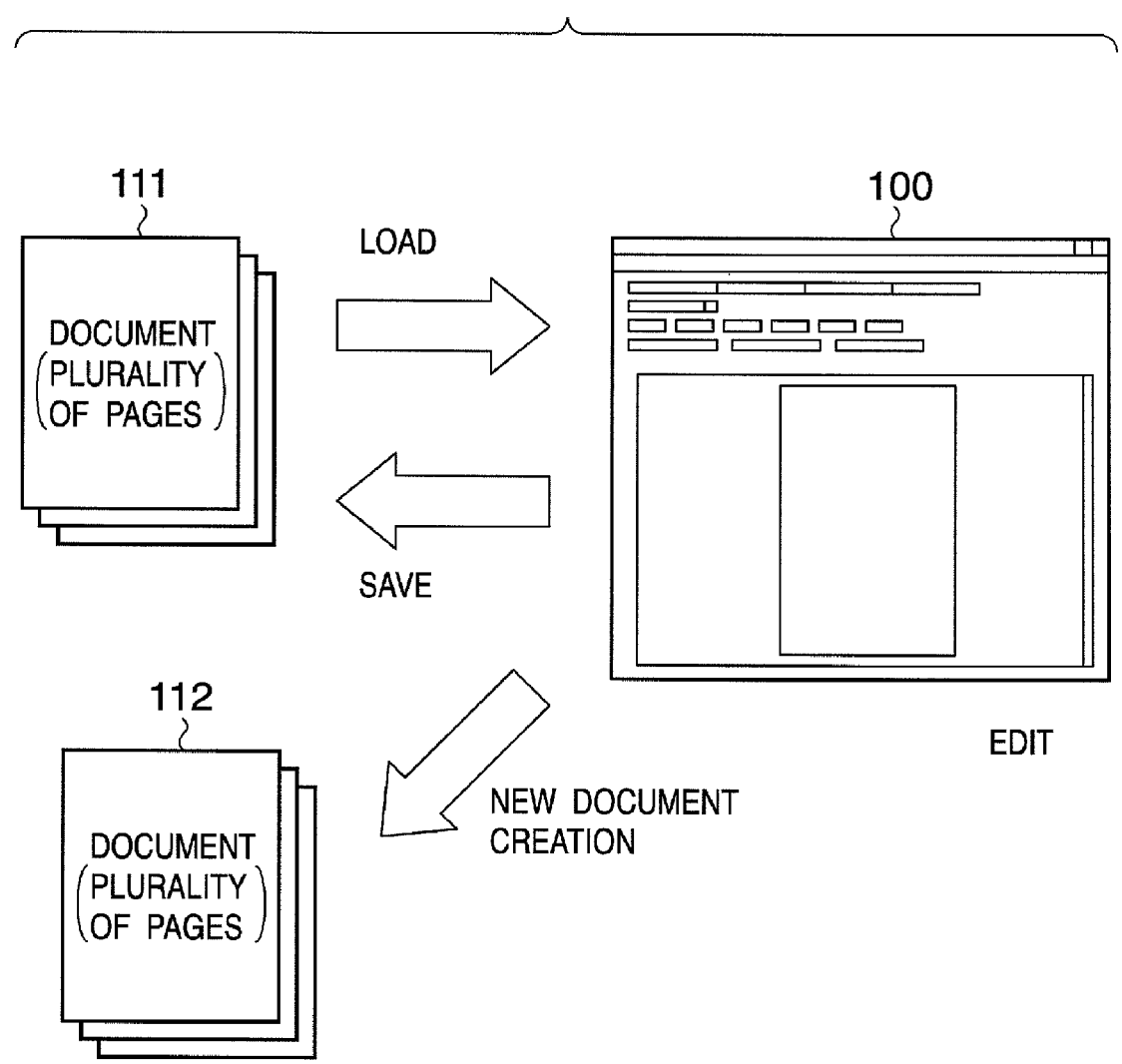
FIG. 1 is a view showing software for editing a document data file according to an embodiment.

The first embodiment of the present invention will be described in detail below with reference to the accompanying drawings. FIG. 1 is a view showing text editing software according to the present invention. A word processing application program 403 loads, saves, and edits document data (document file) 111 having one or a plurality of pages. The word processing application program 403 can be executed by a computer. The word processing application program 403 can also newly create and save document data 112. The edit function of the word processing application program 403 includes editing of each page such as replacement, copying, and deletion of a page, and editing such as insertion, copying, movement, and deletion of an object (e.g., a figure, image, text, or text box) in a page. An editor program 100 opens designated document data to display a preview image in a user interface window. While seeing the user interface window, the operator can edit document data by selecting an object in the preview image or selecting a command menu displayed in the user interface window.

Figure 2:
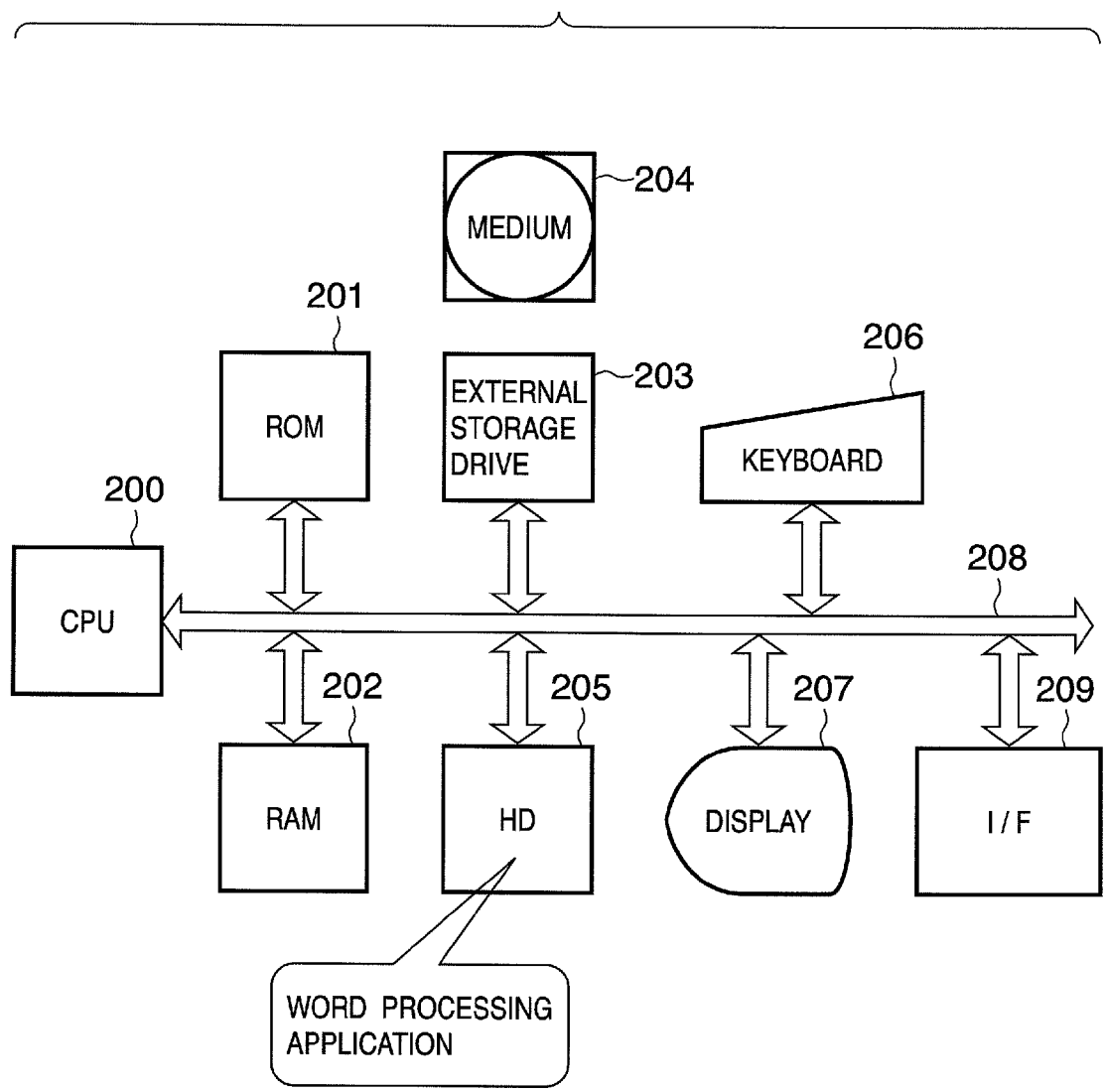
FIG. 2 is a block diagram showing the schematic arrangement of a computer in which the software in FIG. 1 runs.
Figure 4:
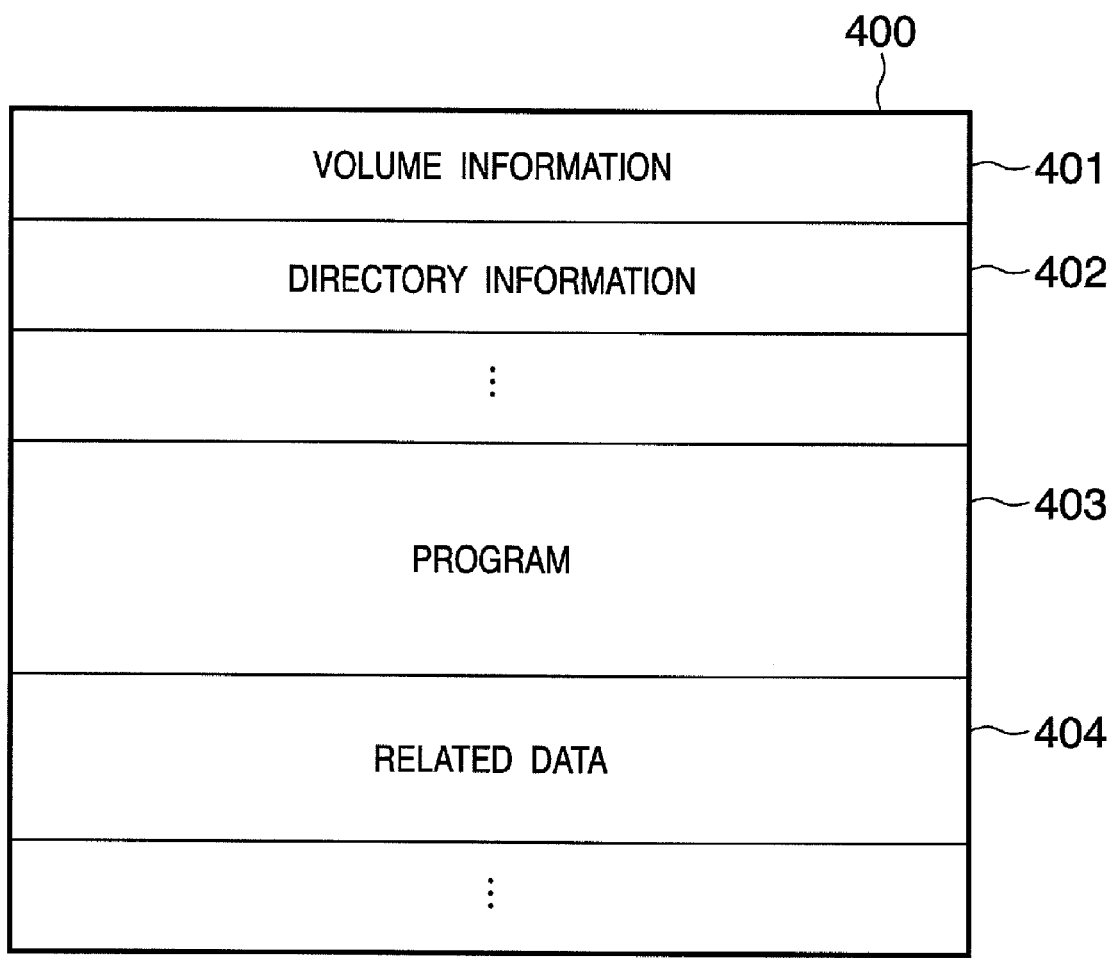
FIG. 4 is a view showing a memory map representing data in a flexible disk in FIG. 2.

FIG. 2 is a block diagram showing the schematic arrangement of a computer in which the program of the present invention runs. A CPU 200 controls to execute application programs (including the word processing application program 403 according to the present invention), printer driver programs, an OS, network printer control programs, and the like, which are stored in an HD (Hard Disk) 205, and to temporarily store, in a RAM 202, information, files, and the like necessary to execute programs. A ROM 201 stores programs such as a basic I/O program, and various data such as font data and template data used in word processing. The RAM 202 functions as a main memory, work area, and the like of the CPU 200. An external storage drive 203 can access programs, data, and the like stored in a removable medium 204 and load them into the computer system. The medium 204 stores programs and related data to be described in the first embodiment. FIG. 4 shows the format of contents stored in the medium 204. The HD 205 stores application programs (including the word processing application program 403 according to the present invention), printer driver programs, an OS, control programs, related programs, and the like, and document data files according to the first embodiment. The user uses a keyboard 206 in order to input a device control command instruction and the like to the client computer. The computer system has a pointing device in addition to the keyboard. The operator can use the pointing device to select an object or command menu item in a user interface window provided by the word processing application program 403. The operator can also use the pointing device to designate processing such as movement, copying, paste, or position adjustment of a selected object.

A display 207 displays a command input from the keyboard 206, a printer status, and the like. A system bus 208 manages the data flow in the client computer. A network interface (to be referred to as an I/F hereinafter) 209 is a communication interface for connecting to a local area network (LAN) or the Internet.

Figure 3:
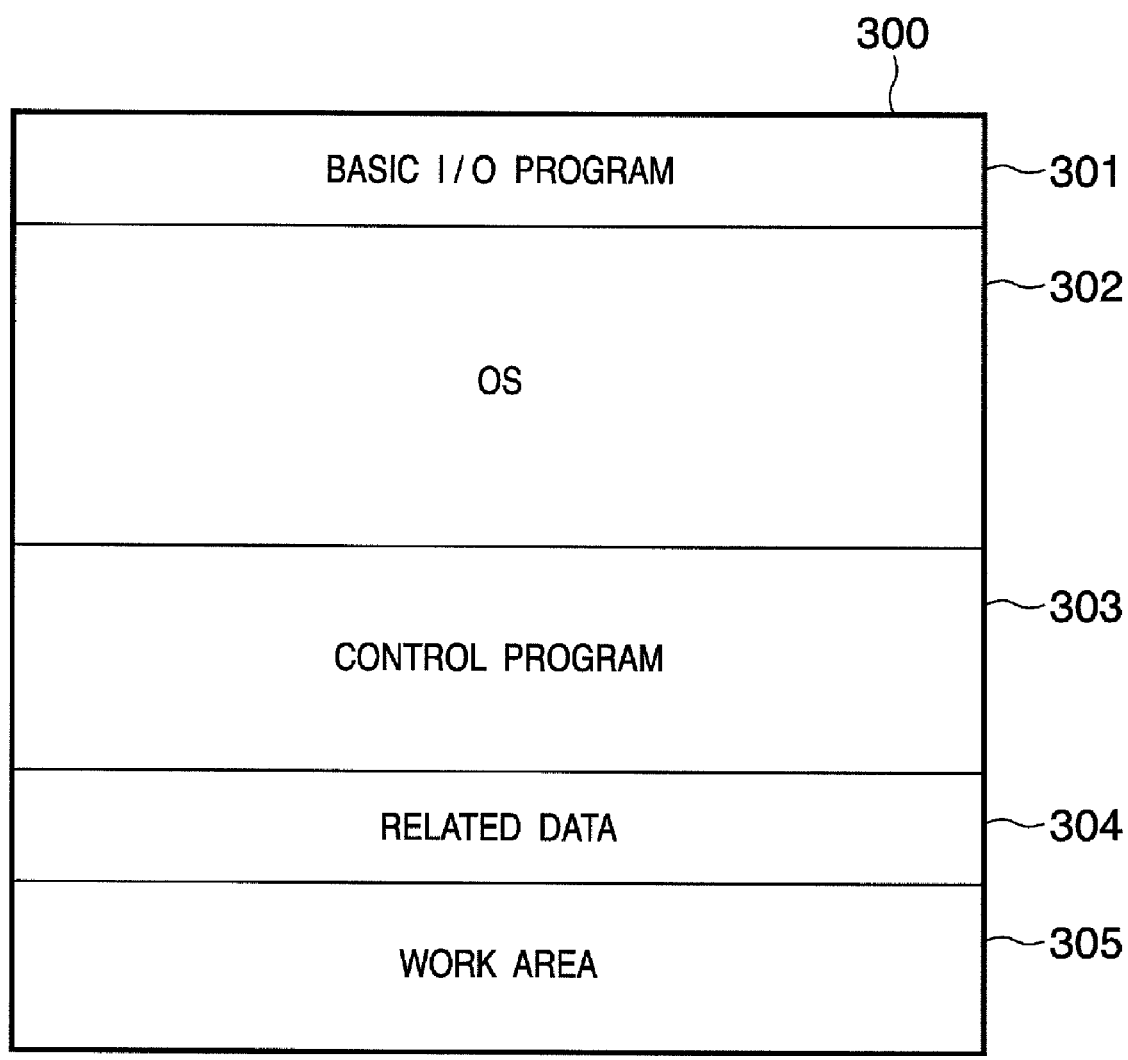
FIG. 3 is a view showing a memory map when expanding a program from an FD shown in FIG. 4 into a RAM in FIG. 2.

FIG. 3 shows a memory map when programs including the word processing application program 403 according to the present invention are loaded into the RAM 202 and become executable. The first embodiment will describe an example of loading programs and related data from the medium 204 directly into the RAM 202, and executing the programs. Alternatively, programs according to the present invention may be loaded from the HD 205 into the RAM 202 every time the programs run from the medium 204. Examples of the medium for recording programs according to the present invention are an FD, CD-ROM, DVD, and IC memory card. It is also possible to record programs according to the present invention in the ROM 201, store them as part of the memory map, and execute them directly by the CPU 200.

In FIG. 3, when turning on the computer, the OS loads a basic I/O program 301 from the HD 205 into the RAM 202. The basic I/O program 301 is an area containing a program having, e.g., an IPL (Initial Program Loading) function of starting operating the OS. An operating system (OS) 302 manages the hardware and software resources of the computer and controls the whole computer. For example, the OS mediates display of a user interface window provided by the word processing application program 403. Also, the OS also provides processing to accept an input in an editing operation and the like. An application program implements interaction with the user via the OS. In addition, a control program 303 and related data 304 are expanded in the memory, and a work area 305 used to execute the program by the CPU 200 is reserved. The related data contains a document data file.

FIG. 4 is a view showing an example of the file layout in a recording medium which records files of the word processing application program 403 according to the first embodiment. In FIG. 4, a data content 400 of the medium 204 contains volume information 401 representing data information, directory information 402, the word processing application program 403 according to the first embodiment, and data (document data file) 404 related to the word processing application program 403. The program 403 is made up of program codes for executing the procedures of flowcharts shown in FIGS. 18 to 22.

Figure 5:
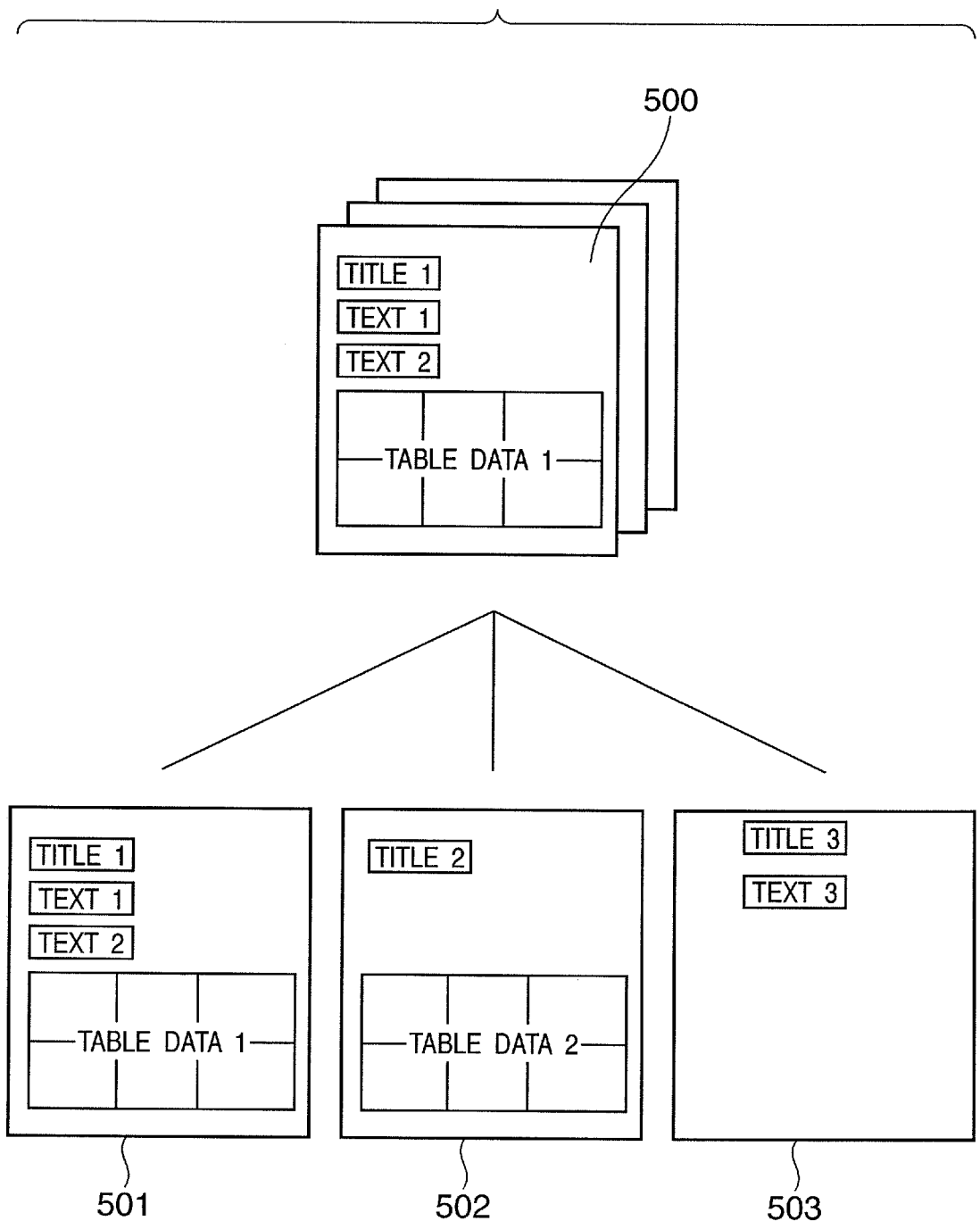
FIG. 5 is a view showing an example of a document data file to be processed in FIG. 1.

FIG. 5 shows an example of document data of a plurality of pages to be processed in the present invention. Document data 500 has three page data: page data 501, page data 502, and page data 503. Each page data has a text area for inputting the title and text of each page, and a table data area for describing table data. In order to improve the appearance of a page upon switching, the sizes and positions of titles 1 to 3, and the position of the table data area are desirably kept unchanged between pages. In FIG. 5, however, the positions of titles 1 and 2 in the pages 501 and 502 are different from that of title 3 in the page 503. In this manner, the document data 500 is divided into pages. When the document data file 500 is, e.g., a sequential file, each record of the sequential file implements each page. The document data file can also take a structure. For example, respective pages are set as independent files (page files), one or a plurality of page files are combined by linking them to an upper node, and one or a plurality of nodes are combined by linking them to an upper node. Repeating this structure gives document data a hierarchical structure. In this case, the top node represents the entire document. In any case, the word processing application program 403 according to the first embodiment generates and edits document data having a plurality of pages. The first embodiment will be described using the document data 500 as a processing target.

Each page data contains information (object related information) related to objects such as a text box, figure, and image laid out in the page. The object related information contains an identifier (object ID: to be referred to as a figure ID in the embodiment) unique to each object in a document or page, the object type, the object position, the size occupied by the object, and data representing the contents of the object. The object type includes, e.g., a text, text box, bitmap image, and vector image. The object contents include text data, vector data, color data of the text or vector, and bitmap data. A 1-page image is drawn on the basis of objects. The word processing application program 403 in the first embodiment performs drawing using a drawing function provided by the OS. In this case, the word processing application program 403 calls the function of the OS in accordance with a predetermined rule. "Drawing" in the first embodiment means calling the function of the OS for drawing. Note that the word processing application program 403 can also execute the "drawing" processing. In this case, "drawing" is processing by the application.

Figure 6:
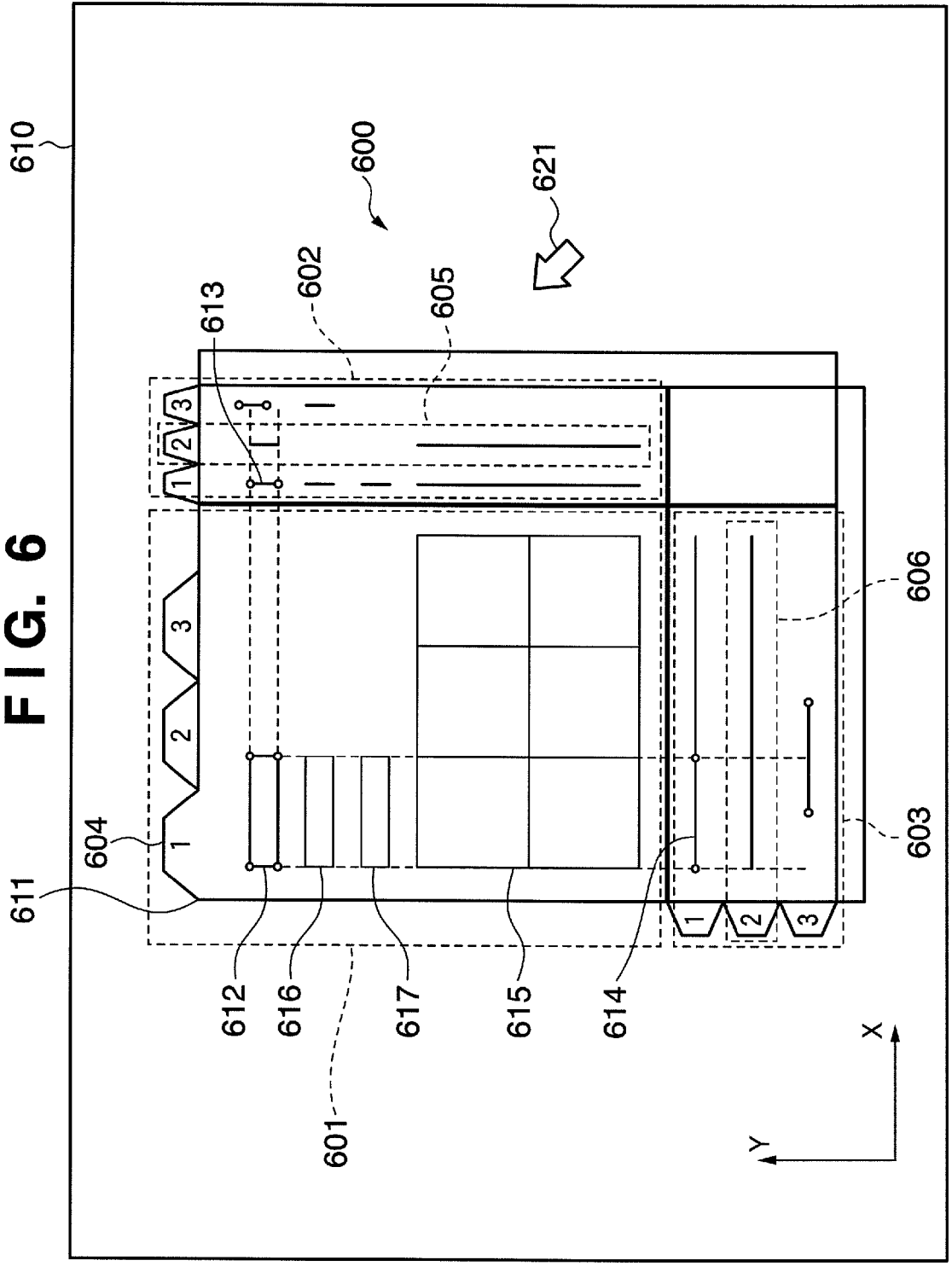
FIG. 6 is a view showing an example of a user interface for editing and displaying a document.
Figure 7:
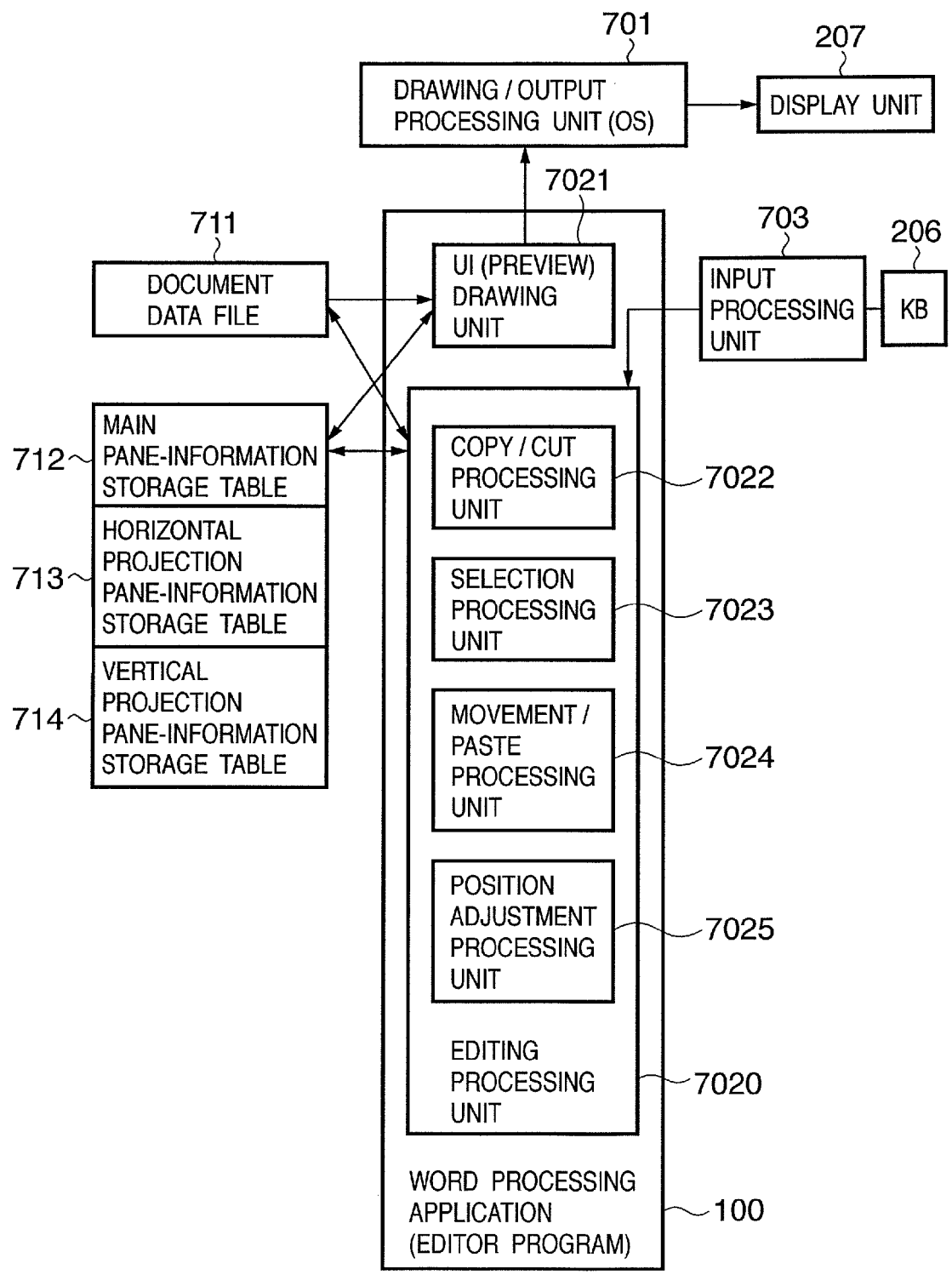
FIG. 7 is a block diagram showing word processing application software according to the embodiment.

FIG. 7 is a block diagram showing software of the word processing application program 403 according to the first embodiment. The word processing application program 403 includes a user interface (UI) drawing unit 7021 and editing processing unit 7020. The user interface drawing unit 7021 reads a document data file 711, and creates a main pane-information storage table 712 (to be described with reference to FIG. 8A) on the basis of object information contained in each page. The user interface drawing unit 7021 creates a horizontal projection pane-information storage table 713 and vertical projection pane-information storage table 714. The word processing application program 403 draws a three-directional view (to be described with reference to FIG. 6) on the basis of these created tables. A drawing/output processing unit 701 of the OS draws a three-directional view, and the display 207 displays it.

Figure 18:
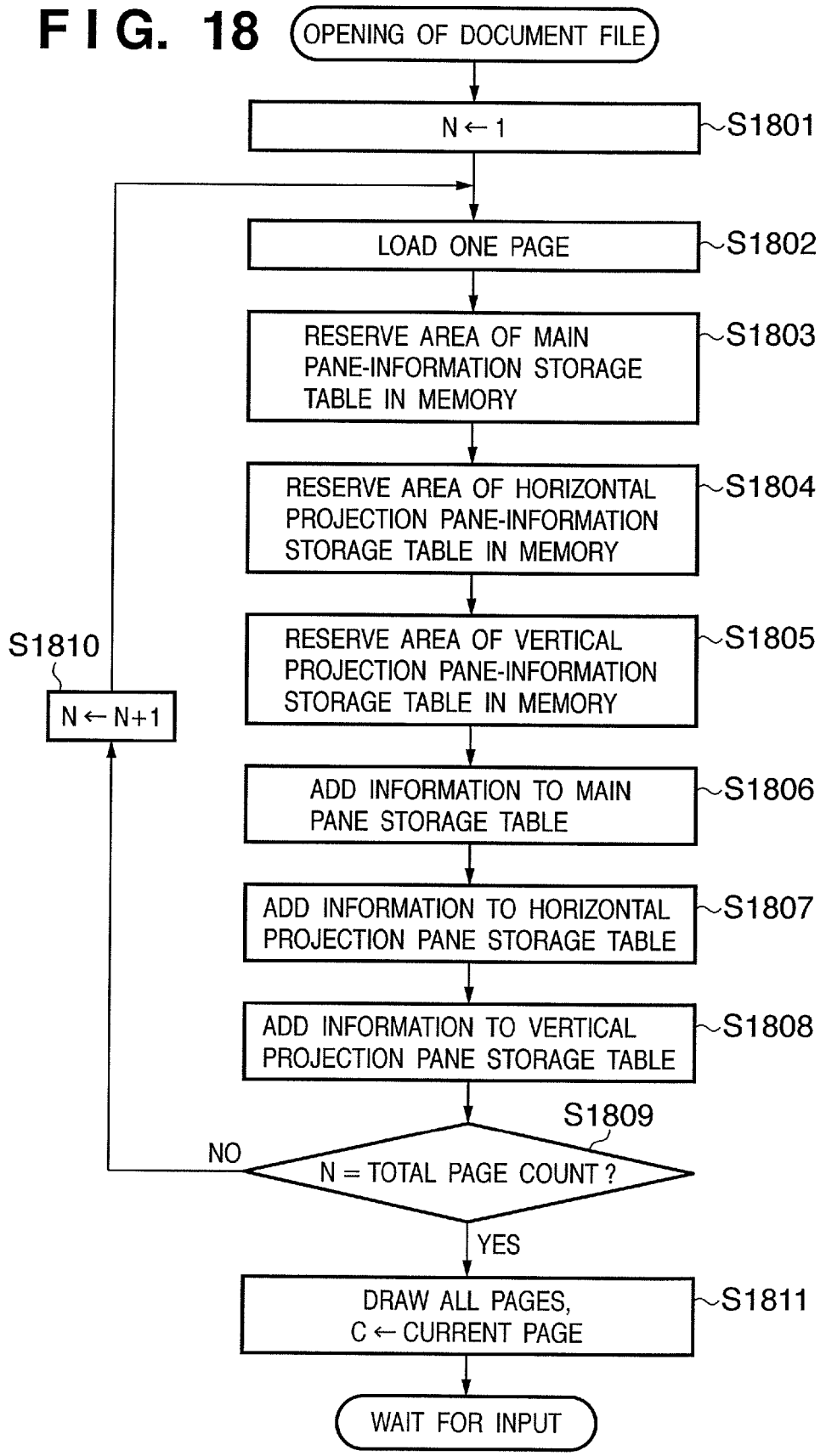
FIG. 18 is a flowchart showing the flow of processing (document file opening) in the embodiment.
Figure 19A:
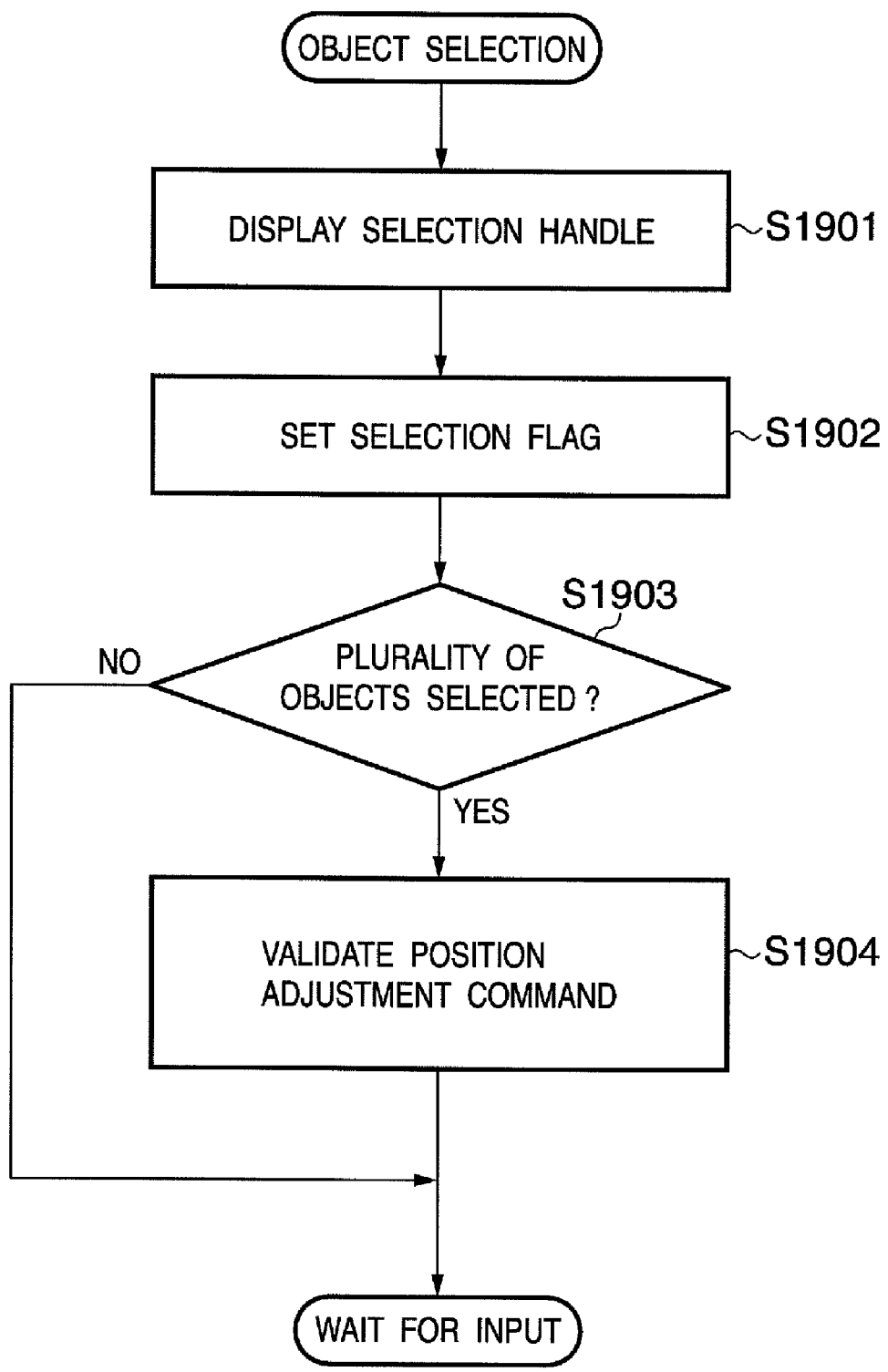
FIG. 19A is a flowchart showing the flow of processing (object selection) in the embodiment.
Figure 19B:
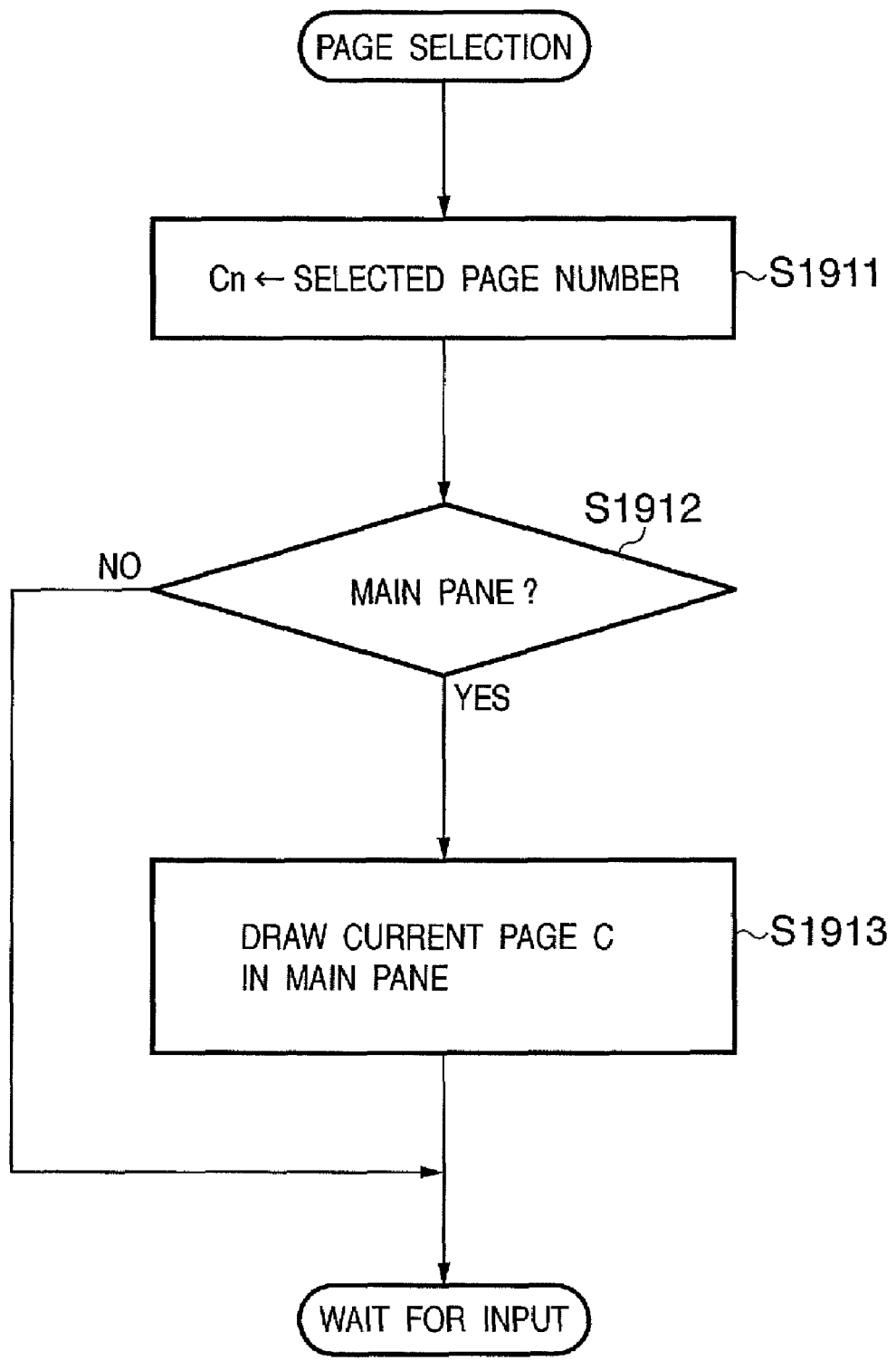
FIG. 19B is a flowchart showing the flow of processing (page selection) in the embodiment.
Figure 20A:
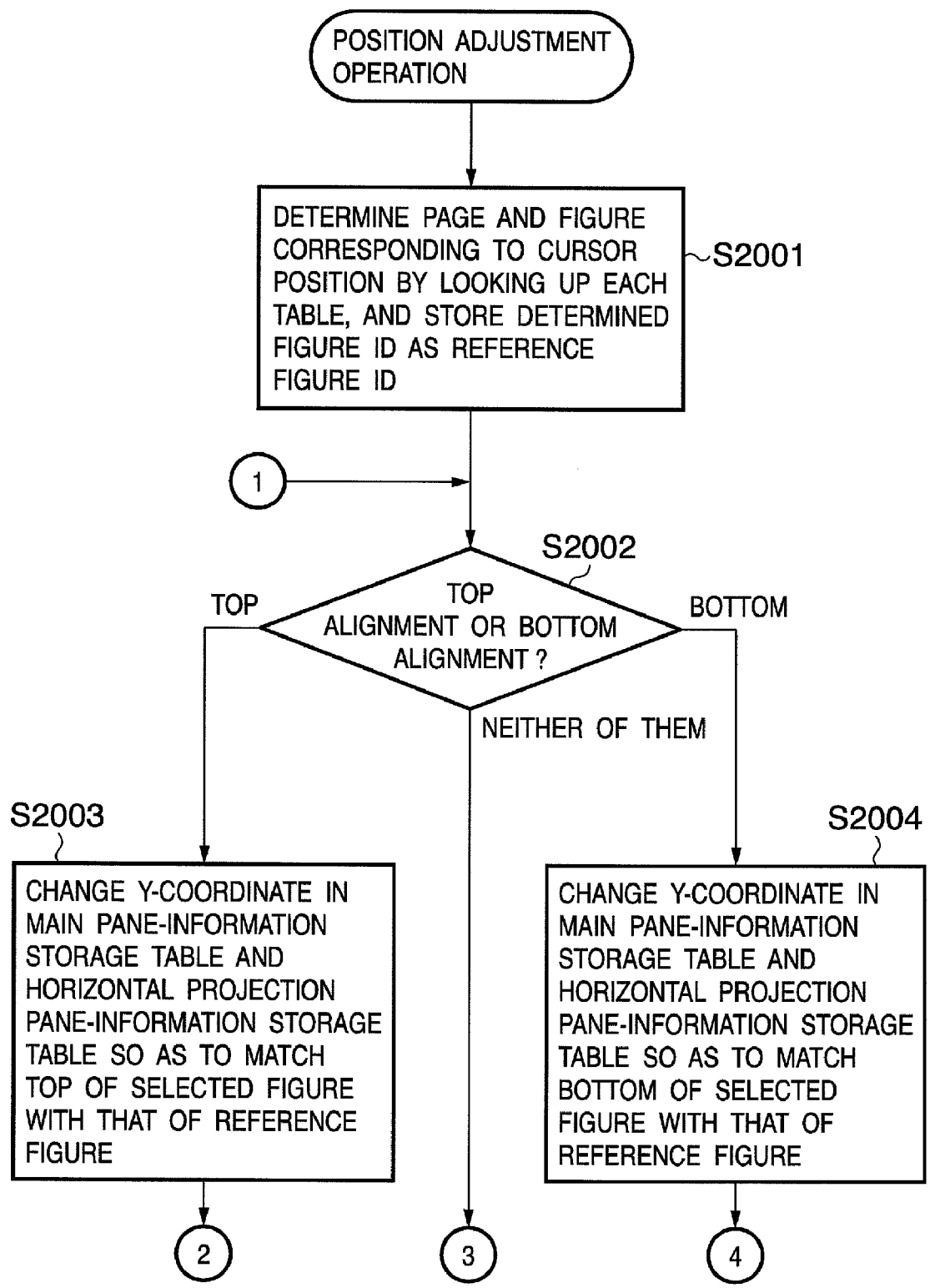
FIGS. 20A and 20B are flowcharts showing the flow of processing (position adjustment processing) in the embodiment.
Figure 20B:
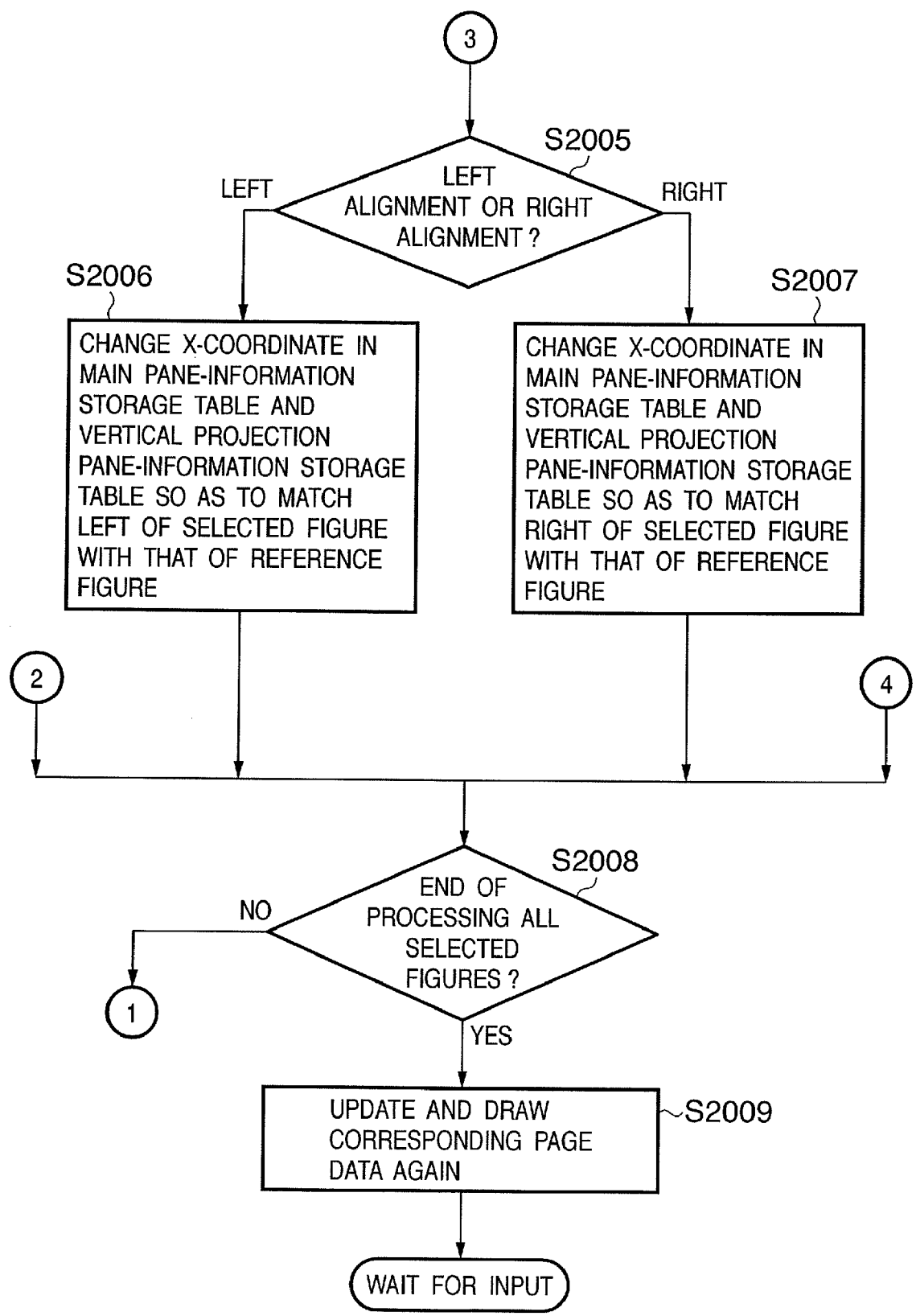
Figure 21:
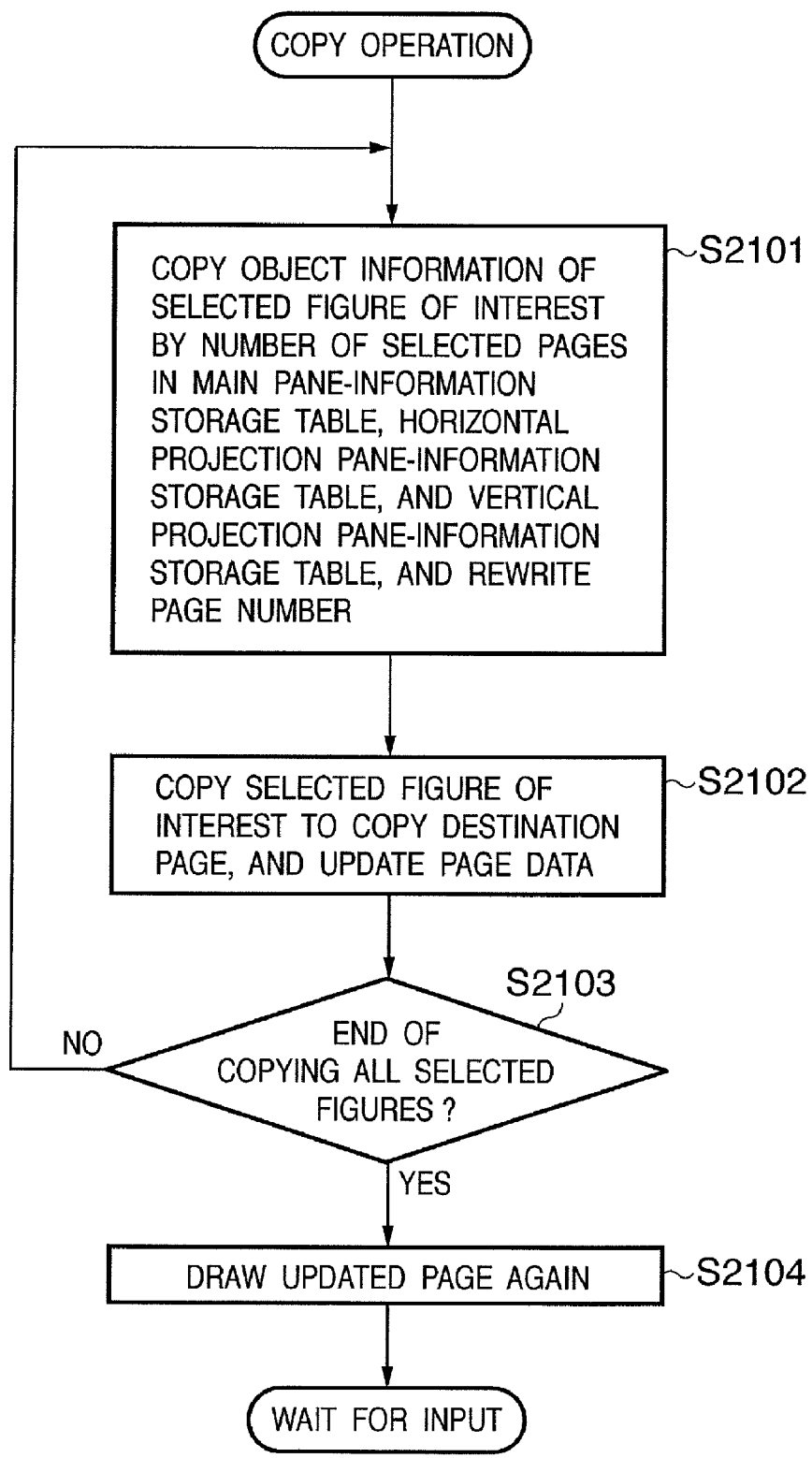
FIG. 21 is a flowchart showing the flow of processing (copy processing) in the embodiment.
Figure 22:
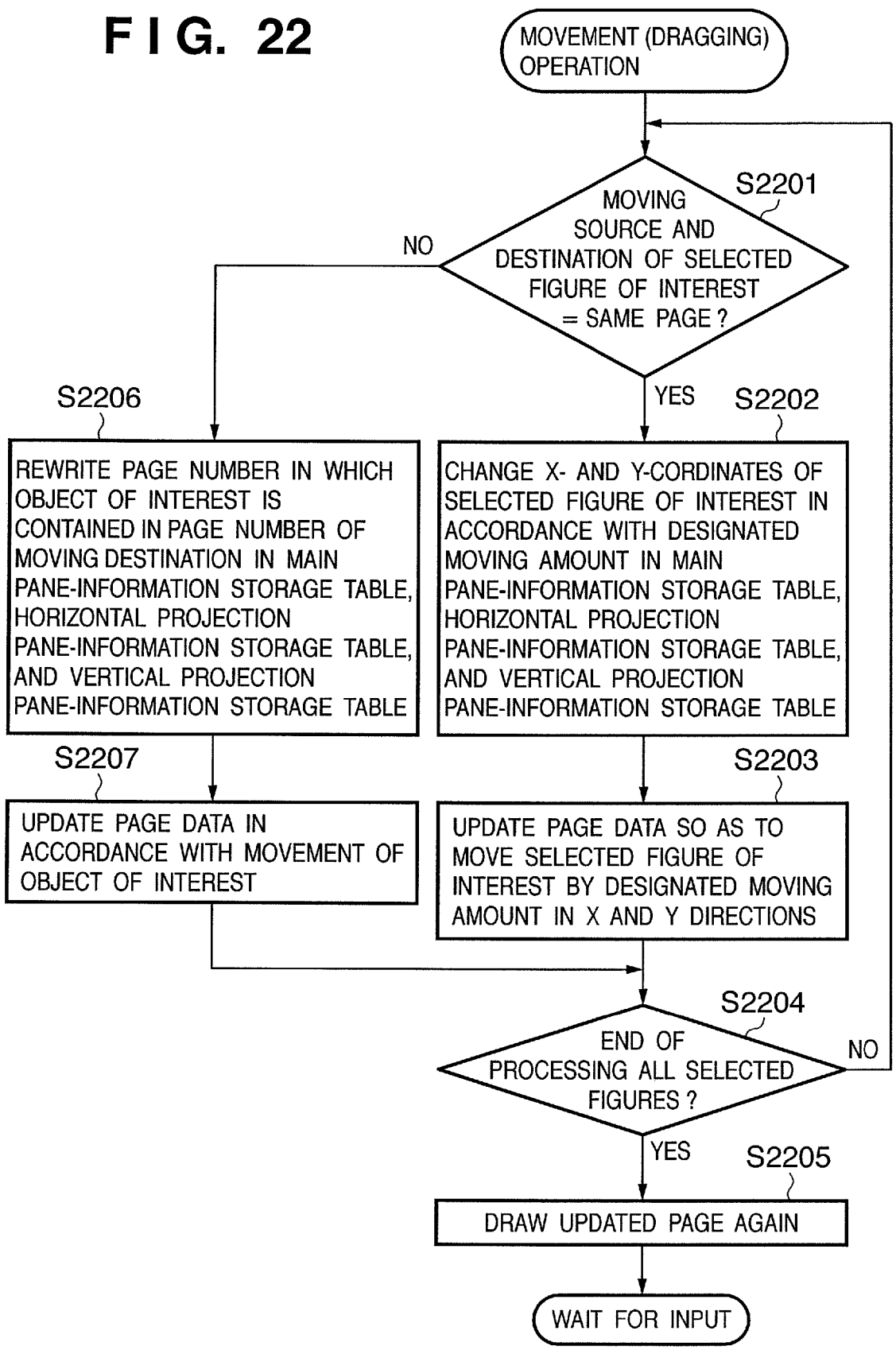
FIG. 22 is a flowchart showing the flow of processing (movement processing) in the embodiment.

The editing processing unit 7020 edits the opened document data file 711 in accordance with data input from the keyboard 206 and the pointing device (not shown) via an input processing unit 703 of the OS. The editing processing unit 7020 includes, for each edit function, a selection processing unit 7023, copy/cut processing unit 7022, movement/paste processing unit 7024, and position adjustment processing unit 7025. FIG. 18 shows processing procedures by the user interface drawing unit 7021. FIGS. 19A and 19B show processing procedures by the selection processing unit 7023. FIGS. 20A and 20B show processing procedures by the position adjustment processing unit 7025. FIG. 21 shows processing procedures by the copy/cut processing unit 7022. FIG. 22 shows processing procedures by the movement/paste processing unit 7024.

In FIG. 7, the UI drawing unit 7021 corresponds to a display means for displaying, on the display unit, a user interface window including the preview image of a page selected from document data, and for a plurality of pages contained in the document data, at least one type of a plurality of horizontally projected images obtained by projecting objects contained in the respective pages in the horizontal direction of the pages, and a plurality of vertically projected images obtained by projecting the objects in the vertical direction of the pages.

The selection processing unit 7023 corresponds to a selection means for selecting one or a plurality of horizontally or vertically projected images drawn by the drawing means, and thereby selecting objects corresponding to the selected projected images.

The editing processing unit 7020 except the selection processing unit 7023 corresponds to an editing processing means for editing an object selected in the user interface window.

FIG. 6 shows an example of a user interface used to edit a document of a plurality of pages by the word processing application program 403. Using the user interface (to be referred to as a three-directional view), the user changes, adds, or deletes an object laid out in each page without switching between pages to display each page. A three-directional view 600 has three panes (window frames). A main pane 601 displays each page of a document when viewed from the front. The main pane 601 displays current page selection tabs 604 corresponding to the number of pages contained in document data to be edited. The main pane 601 displays, as a current page, the contents of a page selected from the current page selection tabs 604. Selecting the current page selection tab 604 allows switching the current page. The position of an image (object) displayed in the three-directional view 600 is based on coordinates using an upper left corner 611 of the current page as the origin. This setting makes it possible to indicate the positions of objects by a common display method in respective pages of document data according to the first embodiment. However, the present invention is not limited to this method as far as the positions of objects can be uniquely indicated and compatibility with document data can be achieved.

A horizontal projection pane 602 displays the sizes and positions of figures (objects) contained in each page of a document. The horizontal projection pane 602 contains a horizontal projection pane tab area 605 of each page. Each figure is drawn as a segment having the vertical position and size of the figure in a horizontal projection pane tab area 605 corresponding to the page in which the figure is contained. That is, a horizontally projected figure drawn in the horizontal projection pane 602 indicates the position, size, and the like of the figure contained in each page when the page is viewed from the side. For example, a figure 612 which is contained in the current page (page 1) and is displayed in the main pane 601 is displayed as a segment 613 having a corresponding vertical position and length in the horizontal projection pane tab area of page 1. Note that the vertical direction described in this specification means the Y-axis direction in FIG. 6, and the horizontal direction means the X-axis direction.

A vertical projection pane 603 displays the sizes and positions of figures (objects) contained in each page of a document. The vertical projection pane 603 contains a vertical projection pane tab area 606 of each page. Each figure is drawn as a segment having the horizontal position and size of the figure in a vertical projection pane tab area 606 corresponding to the page in which the figure is contained. That is, a vertically projected figure drawn in the vertical pane indicates the position, size, and the like of the figure contained in each page when the page is viewed from the top or bottom. For example, the figure 612 which is contained in the current page (page 1) and is displayed in the main pane 601 is displayed as a segment 614 having a corresponding horizontal position and length in the vertical pane tab area of page 1.

Note that the figure 612 and its horizontally projected figure 613 and vertically projected figure 614 are selected in the example of FIG. 6. Circles are added to the corners of the figure area in the main pane and the ends of the segments in the vertical and horizontal projection pane area. Needless to say, the present invention can adopt another display method such as a change of the color or segment type as far as the method allows identifying a selection state.

The word processing application program 403 analyzes the position and size of an object contained in each page of document data, and draws a projected image (synonymous with a projected figure) on the basis of the analyzed object position and size.

The word processing application program 403 draws information on the vertical direction of an object as a horizontally projected image on the basis of the analyzed position and size of the object contained in each page. The word processing application program 403 draws information on the horizontal direction of an object as a vertically projected image.

<Pane-Information Storage Table>

The main pane-information storage table 712, horizontal projection pane-information storage table 713, and vertical projection pane-information storage table 714 are called pane-information storage tables at once. FIGS. 8A to 8C show examples of the pane-information storage tables.

The main pane-information storage table 712 holds, for each figure (object), page information 811 representing a page in which the figure is contained, a figure ID 812 unique to the figure, and an X-coordinate 813 and Y-coordinate 814 of the position of the figure in the main pane. Further, the main pane-information storage table 712 holds a width 815 and height 816 of the figure, and a selection flag 817 representing that the figure is selected. Coordinate values described in the main pane-information storage table 712 are based on the upper left corner of each object as a reference, but the setting of coordinates is not limited to this reference.

The horizontal projection pane-information storage table 713 holds, for each figure (object), page information 821 representing a page in which the figure is contained, and a figure ID 822 unique to the figure. The horizontal projection pane-information storage table 713 also holds an X-coordinate 823 and Y-coordinate 824 of the position of the figure in the horizontal projection pane tab area, and a selection flag 825 representing that the figure is selected. Note that the X-coordinate indicates the position of a horizontally projected image in the horizontal projection pane tab area by using the upper left corner 611 as the origin of coordinate of the main pane. For example, since the horizontally projected figure 613 laid out in the horizontal projection pane 602 of FIG. 6 is located at an X-coordinate "45" measured from the origin of coordinate 611, the horizontal projection pane-information storage table 713 stores "45" in the X-coordinate field. Since the figure 612 in the main pane 601 corresponds to the horizontally projected figure 613 and is located at an X-coordinate "10" measured from the origin of coordinate 611, the main pane-information storage table 712 holds "10" in the X-coordinate field. That is, coordinate values managed in the respective tables of FIGS. 8A to 8C indicate actual display positions, and even corresponding figures (e.g., the figure 612 and horizontally projected figure 613) have different X-coordinate values. For this reason, the X-coordinate value in the horizontal projection pane-information storage table 713 is different from that of a corresponding figure in the main pane-information storage table 712.

The vertical projection pane-information storage table 714 holds page information 831 representing a page in which each figure (object) is contained, and a figure ID 832 unique to the figure. The vertical projection pane-information storage table 714 also holds an X-coordinate 833 and Y-coordinate 834 of the position of the figure in the vertical projection pane tab area, and a selection flag 835 representing that the figure is selected. Note that the Y-coordinate indicates the position of a vertically projected image in the vertical projection pane tab area by using the origin of coordinate 611 of the main pane. Thus, the Y-coordinate value in the vertical projection pane-information storage table 714 is different from that of a corresponding figure in the main pane-information storage table 712. In other word, the Y-coordinate value in the vertical projection pane-information storage table 714 indicates an actual display position measured from the origin of coordinate 611, similar to the X-coordinate.

The main pane-information storage table 712 is a list of pieces of object information extracted from each page data of a document data file except the contents and types of objects. In some cases, the origin of coordinates, the coordinate values, the size unit, and the like may be different from those of page data.

<Processing in Opening Document Data File>

An example of processing procedures by the word processing application program 403 will be explained. FIG. 18 is a flowchart showing processing procedures when the word processing application program 403 according to the present invention opens a designated document data file. Note that the CPU 200 shown in FIG. 2 performs the processes of steps in flowcharts described in this specification.

When the user activates the word processing application program 403, designates a document data file, and designates opening of the file, the word processing application program 403 executes processing to display the three-directional view 600 shown in FIG. 6 in steps S1801 to S1811.

In step S1801, the word processing application program 403 substitutes 1 into a program counter (variable reserved in the memory) N for counting the number of pages of the document data file 500. The counter N is used to process all pages which form a document data file.

In step S1802, the word processing application program 403 loads 1-page data of the target Nth page in the document data file (also called document information) 500 having a plurality of pages. The loaded data are all data necessary for a preview, such as the sizes and position coordinates of various figures drawn in each page, the text character string, and the text decoration format. Note that 1-page data are obtained by recognizing the position and size of an object upon generation of the object in each page, and the RAM 202 or the like holds the information. The word processing application program 403 reads out the above-described pieces of information from a storage unit such as the RAM 202.

In step S1803, the word processing application program 403 reserves, in the memory, the area of the "main pane-information storage table" which stores information for forming the main pane of the Nth page from the document data file of the Nth page. That is, the word processing application program 403 reserves, in the RAM 202, a memory area calculated by multiplying the data amount necessary for one object by the number of objects contained in page data of the Nth page. The reserved area must be physically or logically continuous with a main pane-information storage table which has already been created.

In step S1804, the word processing application program 403 reserves, in the memory, the area of the "horizontal project pane-information storage tablet" which stores information for forming a horizontal project pane from the document information of the Nth page. That is, the word processing application program 403 reserves, in the RAM 202, a memory area calculated by multiplying the data amount necessary for one object by the number of objects contained in page data of the Nth page. The reserved area must be physically or logically continuous with a horizontal project pane-information storage table which has already been created.

In step S1805, the word processing application program 403 reserves, in the memory, the area of the "vertical project pane-information storage table" which stores information for forming a vertical project pane from the document information of the Nth page. That is, the word processing application program 403 reserves, in the RAM 202, a memory area calculated by multiplying the data amount necessary for one object by the number of objects contained in page data of the Nth page. The reserved area must be physically or logically continuous with a vertical project pane-information storage table which has already been created. The three information storage tables, i.e., the main pane-information storage table, horizontal projection pane-information storage table, and vertical projection pane-information storage table are called "pane-information storage tables" at once.

For efficient drawing processing, the word processing application program 403 prepares the three information storage tables in steps S1803 to S1805. However, the word processing application program 403 may construct two tables (horizontal and vertical projection pane-information storage tables) from the main pane-information storage table in drawing (previewing) all pages. In this case, the word processing application program 403 need not execute steps S1804 and S1805.

In step S1806, the word processing application program 403 sets the page number N and object information of page N loaded in step S1802 in the area reserved in step S1803 for the main pane-information storage table. That is, the word processing application program 403 stores a figure ID, X-coordinate, Y-coordinate, width, and height, and sets the selection flag to "OFF".

In step S1807, the word processing application program 403 sets the page number N and object information of page N loaded in step S1802 in the area reserved in step S1804 for the horizontal projection pane-information storage table. That is, the word processing application program 403 stores a figure ID, X-coordinate, and Y-coordinate, and sets the selection flag to "OFF". The X-coordinate registered in the horizontal projection pane-information storage table expresses the X-coordinate of a horizontally projected image displayed in the horizontal projection pane tab area by using a coordinate system (coordinate system of the three-directional view 600) common to the main pane. For this reason, the Y-coordinate of one object in the main pane-information storage table can be directly copied, but no X-coordinate can be directly copied. The X-coordinate value is uniquely determined in correspondence with the page number. In the first embodiment, a horizontally projected image is displayed in the middle of the horizontal projection pane tab area in the horizontal direction. Letting N be the page number, Wm be the width of the main pane, and Wh be the width of the horizontal projection pane tab area, the X-coordinate value is given by $\{Wm+Wh\times(N-1)\}+Wh/2$. Of course, this is merely an example.

In step S1808, the word processing application program 403 sets the page number N and object information of page N loaded in step S1802 in the area reserved in step S1805 for the vertical projection pane-information storage table. That is, the word processing application program 403 stores a figure ID, X-coordinate, and Y-coordinate, and sets the selection flag to "OFF". The Y-coordinate registered in the vertical projection pane-information storage table expresses the Y-coordinate of a vertically projected image displayed in the vertical projection pane tab area by using a coordinate system common to the main pane. For this reason, the X-coordinate of one object in the main pane-information storage table can be directly copied, but no Y-coordinate can be directly copied. The Y-coordinate value is uniquely determined in correspondence with the page number. In the first embodiment, a vertically projected image is displayed in the middle of the vertical projection pane tab area in the vertical direction. Letting N be the page number, Hm be the height of the main pane, and Hv be the height of the vertical projection pane tab area, the Y-coordinate value is given by $\{Hm+Hv\times(N-1)\}+Hv/2$. Needless to say, this is merely an example.

Pieces of information stored in the respective pane-information storage tables in steps S1806 to S1808 are the sizes, position coordinates, and figure IDs of various figures, and the page numbers of existing figures. The position of each figure is calculated as a position relative to the origin (e.g., the upper left corner of the main pane) of the three-directional view 600. The word processing application program 403 automatically generates a figure ID, and gives a unique value to one figure. Object information on one figure is stored together with a common figure ID in the main pane-information storage table, horizontal projection pane-information storage table, and vertical projection pane-information storage table. FIGS. 8A to 8C show examples of the pane-information storage tables after storing information in steps S1806 to S1808.

In step S1809, the word processing application program 403 checks whether the program counter N has reached the total page count of the document data file. If N does not reach the total page count in step S1809, the word processing application program 403 increments the program counter N by one in step S1810, and the flow returns to step S1802. The word processing application program 403 repetitively reserves pane-information storage tables and adds information in steps S1802 to S1808 until N reaches the total page count.

If N has reached the total page count in step S1809, the word processing application program 403 displays the contents of the three-directional view 600 on the basis of all the page data and the pane-information storage tables in step S1811. The word processing application program 403 draws current page selection tabs 604 by the count of the program counter N at the top of the main pane 601. In loading a document, the word processing application program 403 validates one corresponding tab in accordance with the setting of a page to be displayed first (e.g., the first page is displayed immediately after loading). Note that a page corresponding to a valid tab at the top of the main pane 601 will be called a "current page" (or page of interest). The current page can be changed by switching the current page selection tab 604. Upon opening a document data file for the first time, the current page is the start page of the document data file. The word processing application program 403 acquires position information of figures present in the current page from the main pane-information storage table 712, and forms a preview image in the main pane 601. Depending on the preview mode, the word processing application program 403 can display even the contents of objects. In this case, the word processing application program 403 reads the contents of objects by referring to page data, and draws and displays the contents. In a preview mode representing only the presence of objects, the word processing application program 403 identifiably draws and displays areas occupied by the objects on the basis of the positions and sizes of the objects obtained by looking up to the main pane-information storage table.

The word processing application program 403 creates horizontal projection pane tab areas 605 by the count of the program counter N in the horizontal projection pane 602, and acquires position information of figures from the horizontal projection pane-information storage table 713. The word processing application program 403 draws segments as the projected images of the figures in the horizontal projection pane tab area 605 corresponding to each page. The horizontal projection pane tab area 605 also displays a selection tab for selecting a page. The word processing application program 403 creates vertical projection pane tab areas 606 by the count of the program counter N in the vertical projection pane 603, and acquires position information of figures from the vertical projection pane-information storage table 714. The word processing application program 403 draws segments as the projected images of the figures in the vertical projection pane tab area 606 corresponding to each page. In S1811, the word processing application program 403 draws the preview image of a page selected from document data. Further, the word processing application program 403 draws the projected images of objects contained in each of pages contained in the document data on the basis of the respective pane-information storage tables shown in FIGS. 8A to 8C. The word processing application program 403 draws a user interface window including at least one type of horizontally projected images obtained by projecting objects in respective pages in the horizontal direction of the pages, and vertically projected images obtained by projecting the objects in the vertical direction of the pages.

When performing drawing processing, the word processing application program 403 creates object information including a page in which an object included in document data is contained, the position of the object in the page, the size of the object, and information representing whether the operator selects the object. The word processing application program 403 creates a preview image, horizontally projected image, and vertically projected image, and draws a user interface window on the basis of the object information. The vertical projection pane tab area 606 also displays a selection tab for selecting a page.

The processing to display the contents of the three-directional view 600 ends through the processes in step S1801 to S1811. For subsequent re-drawing processing upon update, the memory area holds the page count of the document data represented by the program counter N.

<Object & Page Selection Processing>

According to the procedures in FIG. 18, the operator can perform various editing operations while referring to the three-directional view 600 displayed as shown in FIG. 6. The word processing application program 403 executes editing processing corresponding to the operations. FIGS. 19A and 19B show the procedures of object selection processing and page selection processing accompanying the editing operation.

FIG. 19A is a flowchart showing the procedures of the object selection processing. In order to select a desired object from the three-directional view 600, the operator operates, e.g., the pointing device. For example, the operator moves a cursor displayed by the OS to a predetermined area containing a desired object, and then clicks the button. After the operator performs these selection operations, the processing in FIG. 19A starts.

The word processing application program 403 draws an object image having a selection handle in correspondence with the selected object, and displays the object image again as the selected object in the three-directional view 600 (S1901). For an object selected from any of the main pane, horizontal projection pane, and vertical projection pane, the word processing application program 403 draws again and displays an object corresponding to the selected object in all the panes. For example, in FIG. 6, the figure 612, horizontally projected figure 613, and vertically projected figure 614 correspond to each other, and the user can select one (e.g., the horizontally projected figure 613) of them. Upon selection, the word processing application program 403 displays the object image having the selection handle for the selected figure and even for the remaining figures (figure 612 and vertically projected figure 614) corresponding to the selected figure. In the first embodiment, the selection handle is a circle at each end of a segment.

The word processing application program 403 rewrites a selection flag corresponding to the selected object to "ON" in the main pane-information storage table, horizontal projection pane-information storage table, and vertical projection pane-information storage table (S1902). The word processing application program 403 looks up the main pane-information storage table 712, and determines whether there are a plurality of objects whose selection flags are set (flags having the value "ON" will be called set flags) (i.e., whether a plurality of objects are selected) (S1903). If the word processing application program 403 determines that a plurality of objects have set flags, it validates a position adjustment command (S1904) That is, the processing in FIG. 19A is to select one or a plurality of horizontally or vertically projected images which are drawn, and thereby select objects corresponding to the selected projected images.

As described above, the operator can select a figure from any of the main pane, horizontal projection pane, and vertical projection pane. When the operator selects a figure in the main pane, the word processing application program 403 displays the selection handles of corresponding figures even in the horizontal and vertical projection panes on the basis of figure IDs stored in the respective tables, and updates the information storage tables. Also when the operator selects a figure in the horizontal or vertical projection pane, the word processing application program 403 synchronously displays selection handles in all the panes and updates the information storage tables.

FIGS. 9A to 9C show examples of a main pane-information storage table 801, horizontal projection pane-information storage table 802, and vertical projection pane-information storage table 803 containing selected objects. The object "title 1" of page 1 and the object "title 3" of page 3 are selected in the respective pane-information storage tables, and the corresponding selection flags are set to "ON".

FIG. 10 is a table showing an example of a position adjustment command table representing whether the position adjustment command is valid or invalid. The position adjustment command is used to adjust the positions of a plurality of objects. The command is valid only when the operator selects a plurality of objects. The position adjustment command table holds information 1012 representing whether a command corresponding to an entry 1011 of the position adjustment command table is valid or invalid. When the position adjustment command is validated in step S1904 of FIG. 19A, information representing that the command is valid is written in an entry corresponding to the valid command. In the example of FIG. 10, when the operator selects a plurality of objects, two position adjustment commands "top alignment" and "bottom alignment" are validated. This also applies to other alignment commands such as "right alignment", "left alignment", "middle alignment in the horizontal direction", and "middle alignment in the vertical direction". When the position adjustment command is invalid, the command menu grays out the position adjustment command to inhibit the operator from selecting the position adjustment command.

FIG. 19B is a flowchart showing the procedures of the page selection processing. Page selection in the main pane is to switch the current page. The processing in FIG. 19B starts upon selecting one of selection tabs corresponding to pages in the main pane, horizontal projection pane, and vertical projection pane.

The word processing application program 403 saves the page number of a selected page in, e.g., an array variable Cn set in the RAM 202 (S1911). When the operator selects a plurality of pages, the word processing application program 403 saves all the selected page numbers by changing the array suffix n. The word processing application program 403 determines whether the operator selects a page in the main pane (S1912). If the word processing application program 403 determines that the operator selects a page in the main pane (i.e., he selects a tab in the main pane), it draws the selected page as a new current page in the main pane. At this time, the word processing application program 403 draws a three-directional view on the basis of information of the current page in the main pane-information storage table by looking up the main pane-information storage table (if necessary, page data, too) (S1913).

<Object Position Adjustment Processing>

FIGS. 20A and 20B show processing (also called alignment processing) to simultaneously change and adjust the positions of figures in pages by using the three-directional view 600. For position adjustment, the operator must select a plurality of objects. The operator can also select objects from any of the main pane, horizontal projection pane, and vertical projection pane. That is, the operator can select a plurality of objects contained in different pages by selecting the projected images of objects displayed in the horizontal or vertical projection pane. For example, the operator selects a position adjustment command while pointing the cursor to a reference object.

Figure 11:
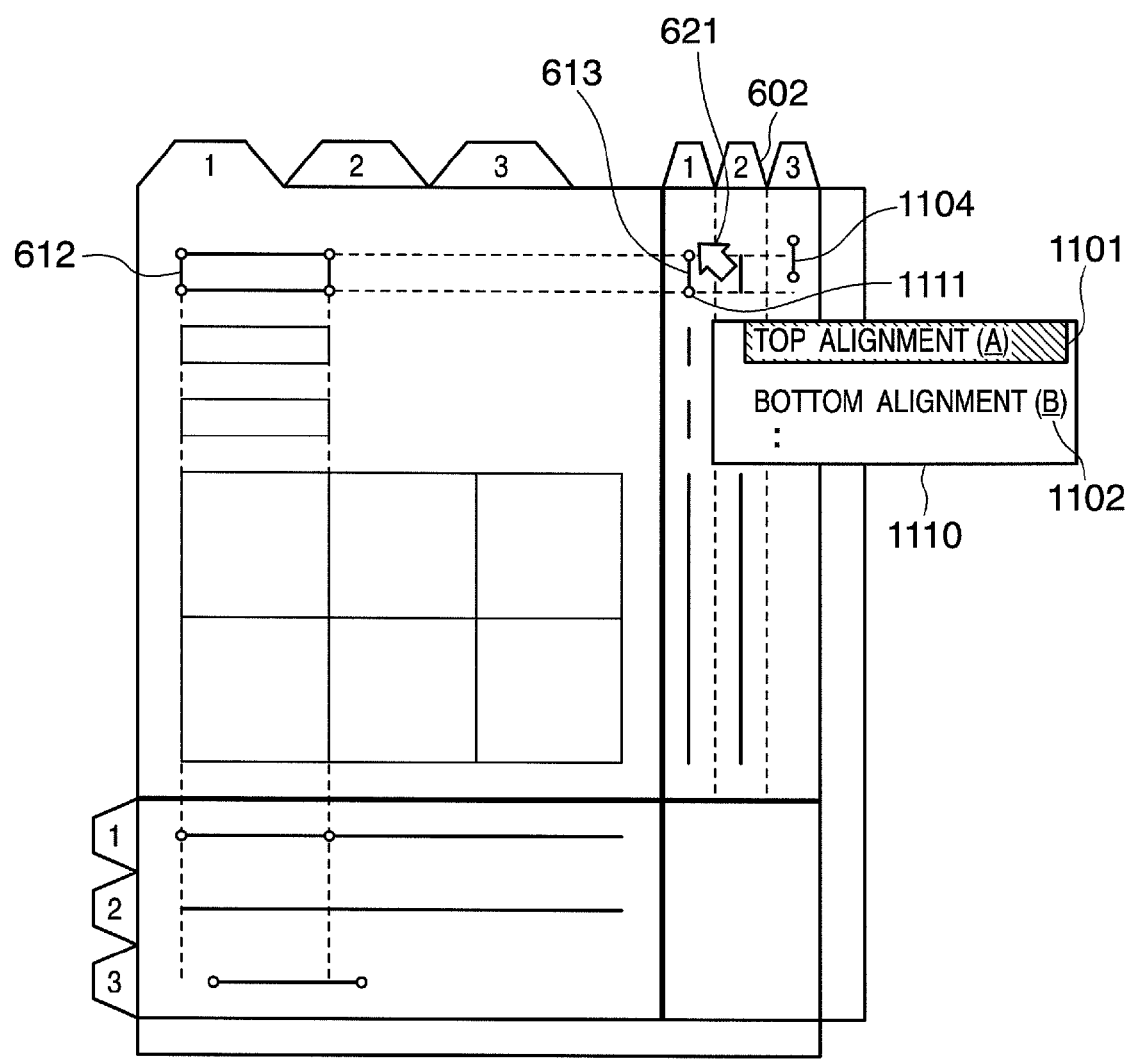
FIG. 11 is a view showing a vertical alignment state.
Figure 12:
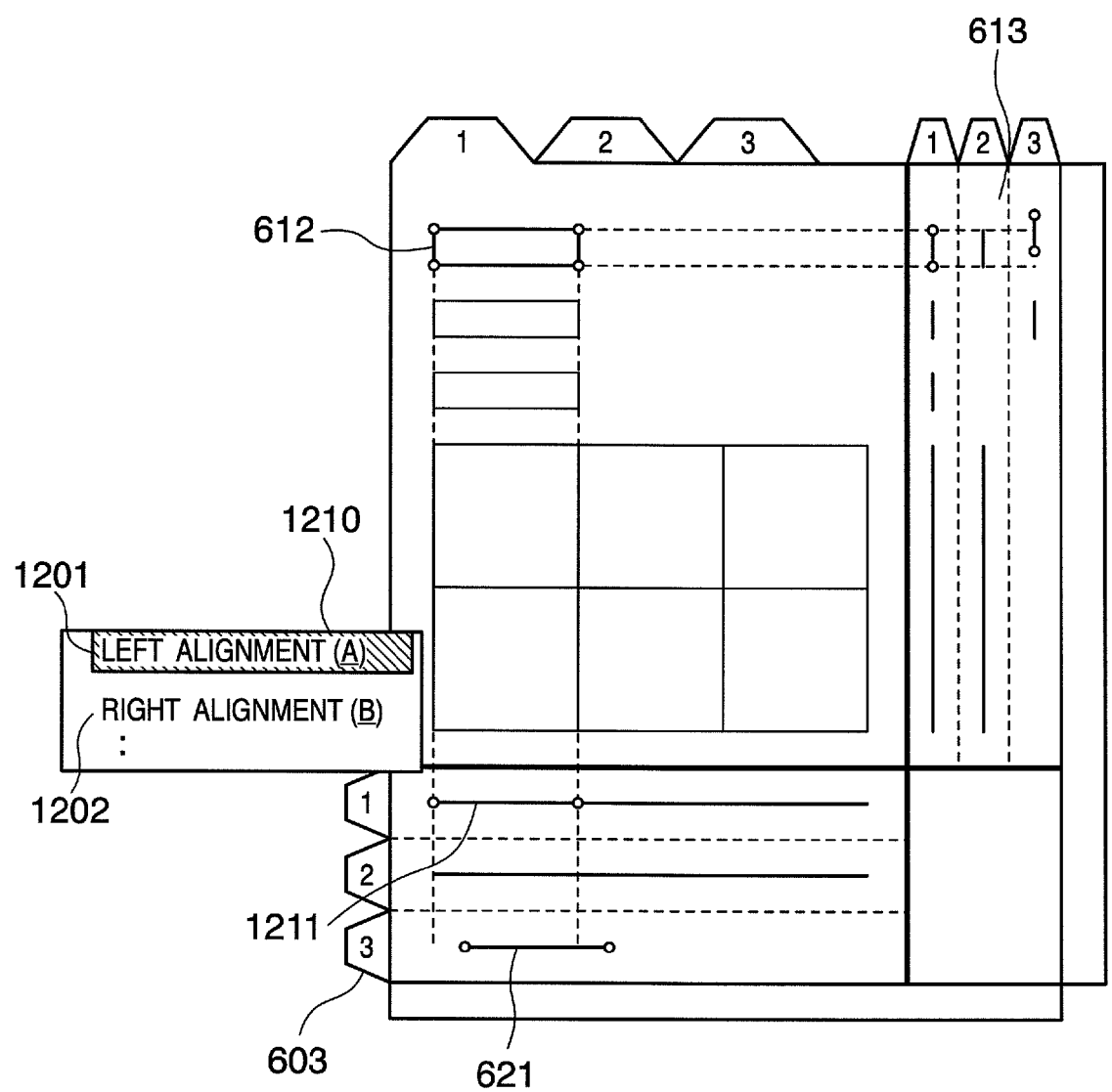
FIG. 12 is a view showing a horizontal alignment state in FIG. 7.

As a command to designate execution of position adjustment, the operator performs a predetermined operation such as an instruction from a main menu provided by the user interface or right clicking in the horizontal/vertical projection pane. The method of inputting the command can take various methods such an instruction from a context menu displayed by the predetermined operation, and a short-cut key operation. The first embodiment will exemplify the context menu displayed by right clicking. FIG. 11 is a view showing a case of executing a position adjustment command in the horizontal projection pane. FIG. 12 is a view showing a case of executing a position adjustment command in the vertical projection pane. In either case, a command box 1110 in FIG. 11 or a command box 1210 in FIG. 12 is displayed by clicking the right button of the pointing device on (or near) a selected object. The operator selects a desired position adjustment command from the command box. The operator can select a top alignment command 1101 or bottom alignment command 1102 as the position adjustment command in the horizontal projection pane. The operator can select a left alignment command 1201 or right alignment command 1202 as the position adjustment command in the vertical projection pane. Since the type of executable position adjustment changes between the horizontal and vertical projection panes (vertical alignment in horizontal projection, and horizontal alignment in vertical projection), a menu reflecting the position adjustment type can be displayed. The processing in the flowchart of FIGS. 20A and 20B can start upon selecting any command in the state of FIG. 11 or 12.

In step S2001, the word processing application determines an object serving as a position adjustment reference. For example, the word processing application displays position adjustment commands when the operator moves the cursor position onto a desired object and executes a predetermined operation (e.g., right clicking) while selecting a plurality of objects. At this time, the word processing application determines the object at the cursor position as a reference object. The word processing application saves the figure ID of the determined object as a reference object ID in the RAM 202. When the figure ID is unique in a page, the word processing application also saves a page number together with the figure ID in order to guarantee uniqueness in the document.

The word processing application determines whether a position adjustment command input (or selected) from position adjustment commands displayed in step S2001 is the top alignment command, bottom alignment command, or another command. If the word processing application determines that the input position adjustment command is the top alignment command, the flow branches to step S2003; if it determines that the input position adjustment command is the bottom alignment command, to step S2004; if it determines that the input position adjustment command is another command, to step S2005. In steps S2003 to S2007, a "selected figure" is a figure of interest among one or a plurality of selected figures. The "selected figure" does not contain the reference figure selected in S2001.

In step S2003, the word processing application program 403 matches the top of the selected figure except the reference figure with that of the reference figure. More specifically, the word processing application program 403 changes the Y-coordinate value of the "selected figure" in the main pane-information storage table and horizontal projection pane-information storage table. That is, the word processing application reads the Y-coordinate of the reference figure, and updates the Y-coordinate value of the "selected figure" to that of the reference figure.

In step S2004, the word processing application program 403 matches the bottom of the selected figure except the reference figure with that of the reference figure. More specifically, the word processing application program 403 changes the Y-coordinate value of the "selected figure" in the main pane-information storage table and horizontal projection pane-information storage table. That is, the word processing application program 403 updates the Y-coordinate value of the "selected figure" to a value calculated by subtracting the height of the "selected figure" from the sum of the height and the Y-coordinate value of the reference figure.

In step S2005, the word processing application program 403 determines whether the command is either the left and right alignment commands. The first embodiment assumes four position adjustment commands.

In step S2006, the word processing application program 403 matches the left of the selected figure except the reference figure with that of the reference figure. More specifically, the word processing application program 403 changes the X-coordinate value of the "selected figure" in the main pane-information storage table and vertical projection pane-information storage table. That is, the word processing application program 403 reads the X-coordinate of the reference figure, and updates the X-coordinate value of the "selected figure" to that of the reference figure.

In step S2007, the word processing application program 403 matches the right of the selected figure except the reference figure with that of the reference figure. More specifically, the word processing application program 403 changes the X-coordinate value of the "selected figure" in the main pane-information storage table and vertical projection pane-information storage table. That is, the word processing application program 403 updates the X-coordinate value of the "selected figure" to a value calculated by subtracting the width of the "selected figure" from the sum of the width and the X-coordinate value of the reference figure.

In step S2008, the word processing application program 403 determines whether all selected figures have received attention. The word processing application program 403 implements the processing in step S2008 by determining whether the X or Y-coordinate values of objects whose selection flags are set to "ON" match the X or Y-coordinate value of the reference object. If there is a selected figure which has not received attention yet, the word processing application program 403 pays attention to the selected figure, and the flow branches to step S2002. If all the selected figures have received attention and the processing ends, the flow branches to step S2009.

In step S2009, the word processing application program 403 draws a three-directional view again on the basis of the contents (especially positions) of the pane-information storage table updated by the above processing. The word processing application program 403 displays the re-drawn image. After that, the flow waits for a new input.

The processing in FIGS. 20A and 20B are alignment processing to align a plurality of objects, which are selected in the user interface window and contained in different pages, by using an object selected by the operator as a reference in accordance with one alignment processing instruction by the operator. This processing can align objects laid out in a plurality of pages to a reference object by one alignment processing instruction without switching the display page, improving operability.

Note that a saved document data file is updated upon selecting a "save" command through the user interface. Page data update processing in the flowchart of the first embodiment assumes document data expanded in the RAM 202 or the like.

Figure 13D:
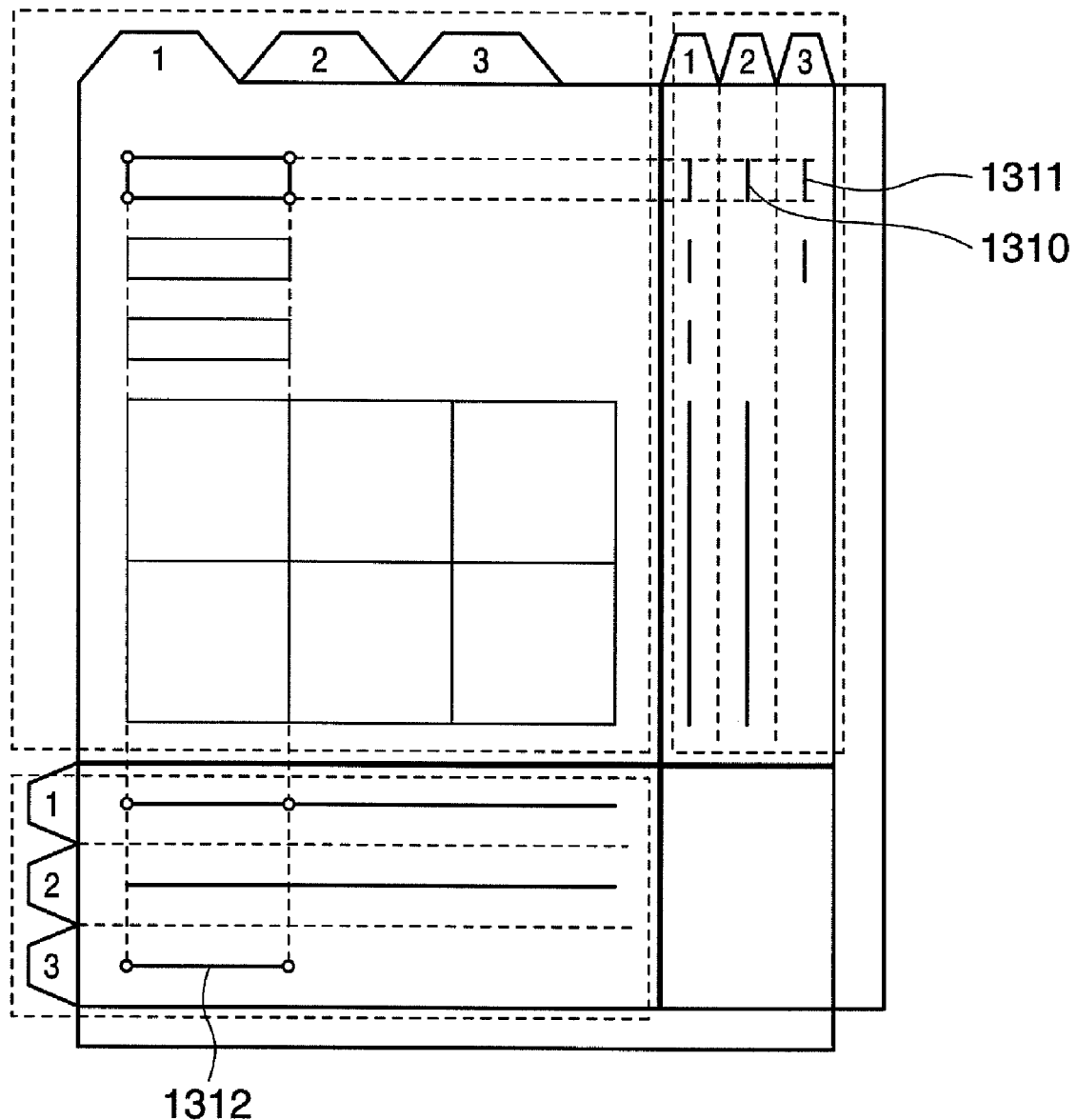
FIG. 13D is a view showing an example of a user interface in vertical and horizontal alignment processes.
Figure 13E:
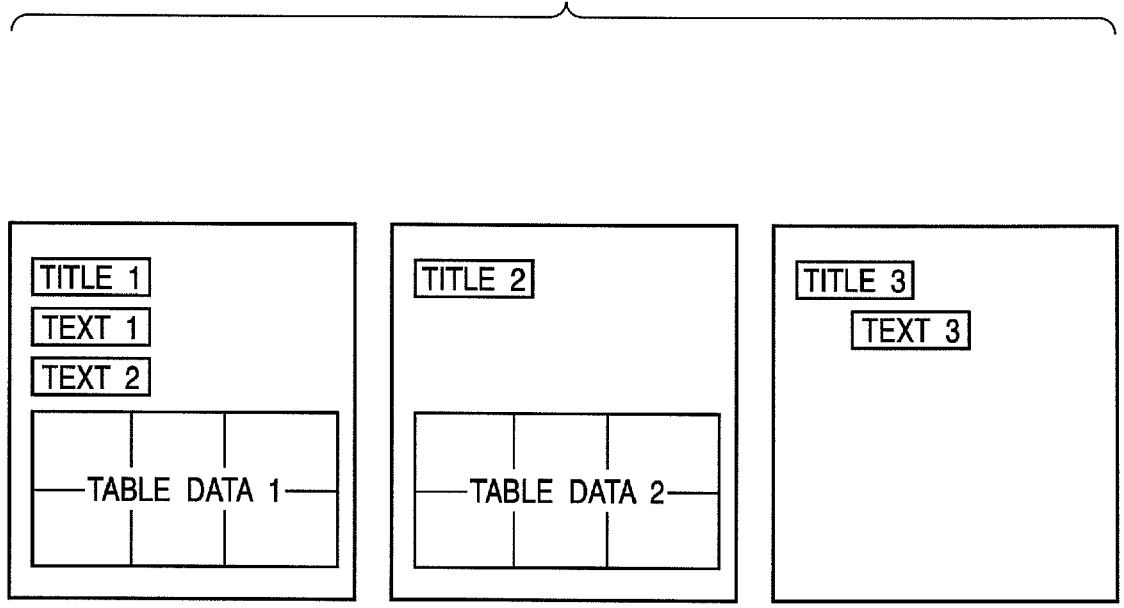
FIG. 13E is a view showing the processing result of the vertical and horizontal alignment processes.

FIGS. 13A to 13C show pane-information storage tables when the operator selects and executes the top alignment command and left alignment command using the figure "title 1" of page 1 as a reference in a state represented by the pane-information storage table 801 shown FIG. 9A. The reference figure is the figure "title 1", and another "selected figure" is the figure "title 3" of page 3. Top alignment command processing updates the respective tables, like a pane-information storage table 1302*b*. As represented by S2003, the Y-coordinate value of the selected figure "title 3" is updated to that of the reference figure "title 1". Executing the left alignment command updates the X-coordinate value of the figure "title 3", which is registered in a vertical projection pane-information storage table 1302*c*, to that of the reference figure "title 1". As a result of updating the pane-information storage tables, as shown in FIGS. 13A to 13C, the top and left of "title 1" of page 1 and those of "title 3" of page 3 match each other without switching between the pages, as shown in FIGS. 13D and 13E.

The word processing application program allows the operator to select objects contained in respective pages of a document data file displayed in the three-directional view 600 without switching between the pages. Even if the selected objects is contained in different pages, the operator can move the positions of the selected objects in accordance with the position of the reference object, improving operability. An operation error due to an operation complicated by page switching is less likely to occur.

The above procedures can align the positions of a plurality of objects present in a plurality of pages by one position adjustment operation.

<Object Movement Processing>

Figure 15A:
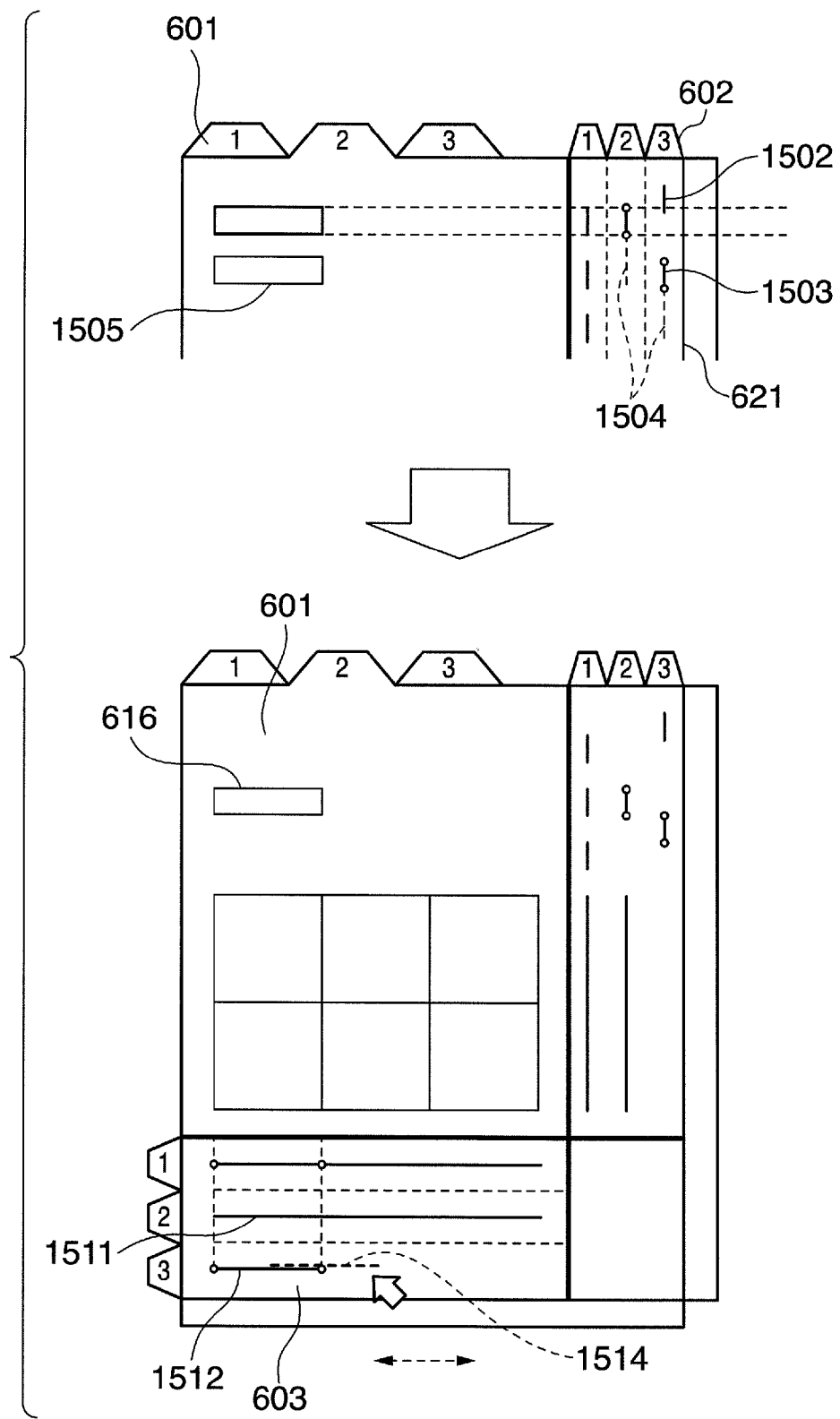
FIG. 15A is a view showing a figure movement processing state.

FIG. 15A is a view showing an example of simultaneously moving figures contained in a plurality of pages within the pages respectively containing the figures by using the three-directional view 600. Assume that the user is to simultaneously move down title 2 of the second page and text 3 of the third page. In this case, the user selects a horizontally projected figure 1502 corresponding to title 2 of the second page and a horizontally projected figure 1503 corresponding to text 3 of the third page in the horizontal projection pane 602, as shown in FIG. 15A. The user drags either figure to a desired position with the pointing device to move the figures up or down. In the first embodiment, a figure is moved by mouse dragging, but this function may be implemented by, e.g., inputting a value into a dialog box, or operating the cursor key. The horizontal projection pane 602 presets, e.g., a slide bar 1504 to exhibit the position of a moving figure. The main pane 601 may also notify the user of the moving destination by, e.g., expressing the frame of a figure in a dotted line 1505. It is also possible to change a tab validated upon pressing a key during movement and switch the current page so that the user can easily visually check a hidden figure (figure 1503 of the third page in the first embodiment) in the main pane 601 during movement.

The user can also horizontally move figures in the vertical projection pane 603 by selecting and dragging vertically projected figures 1511 and 1512, similar to figures in the horizontal projection pane 602. The user may switch between the horizontal projection pane 602 and the vertical projection pane 603 by a keyboard operation or a mouse dragging operation of a predetermined distance in order to smoothly switch between vertical movement in the horizontal projection pane 602 and horizontal movement in the vertical projection pane 603.

Figure 15B:
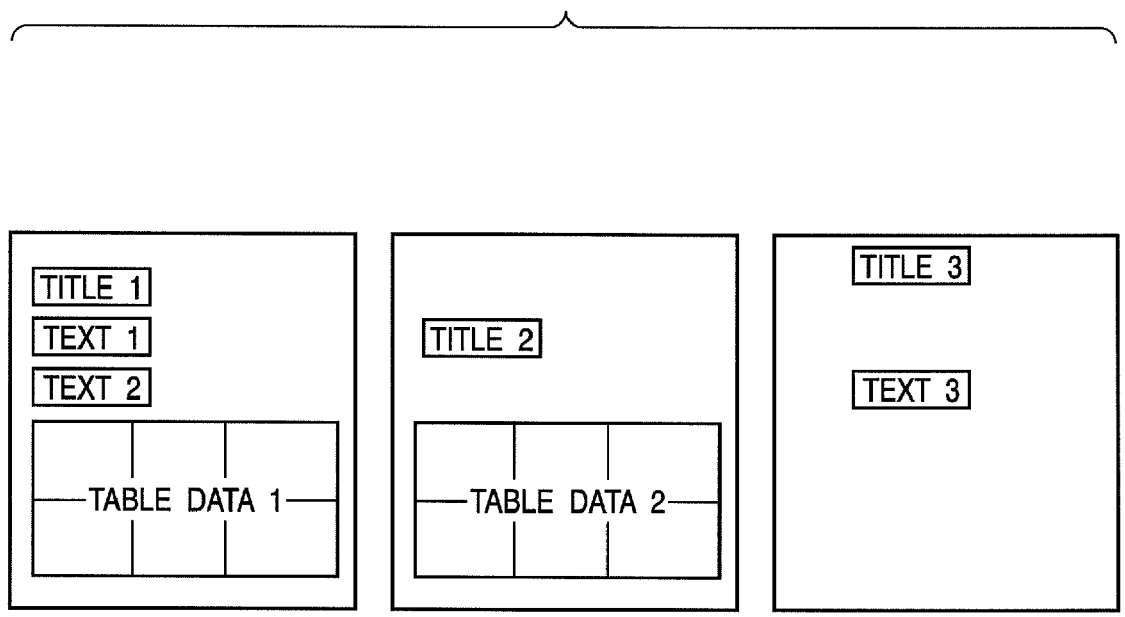
FIG. 15B is a view showing an example of the processing result of figure movement processing.

FIG. 15B is a view showing the result of simultaneously moving title 2 of the second page and text 3 of the third page using the three-directional view 600 in FIG. 15A. FIG. 15B shows that title 2 of the second page and text 3 of the third page move down more than those in FIG. 5 before movement. The processing shown in FIG. 15A can move objects present in different pages without switching between the pages, and improve user operability.

This processing allows the operator to perform intra-page movement processing to move a plurality of objects, which are selected in the user interface window and are contained in different pages, within respective pages in accordance with one intra-page movement processing instruction by the operator.

Figure 16A:
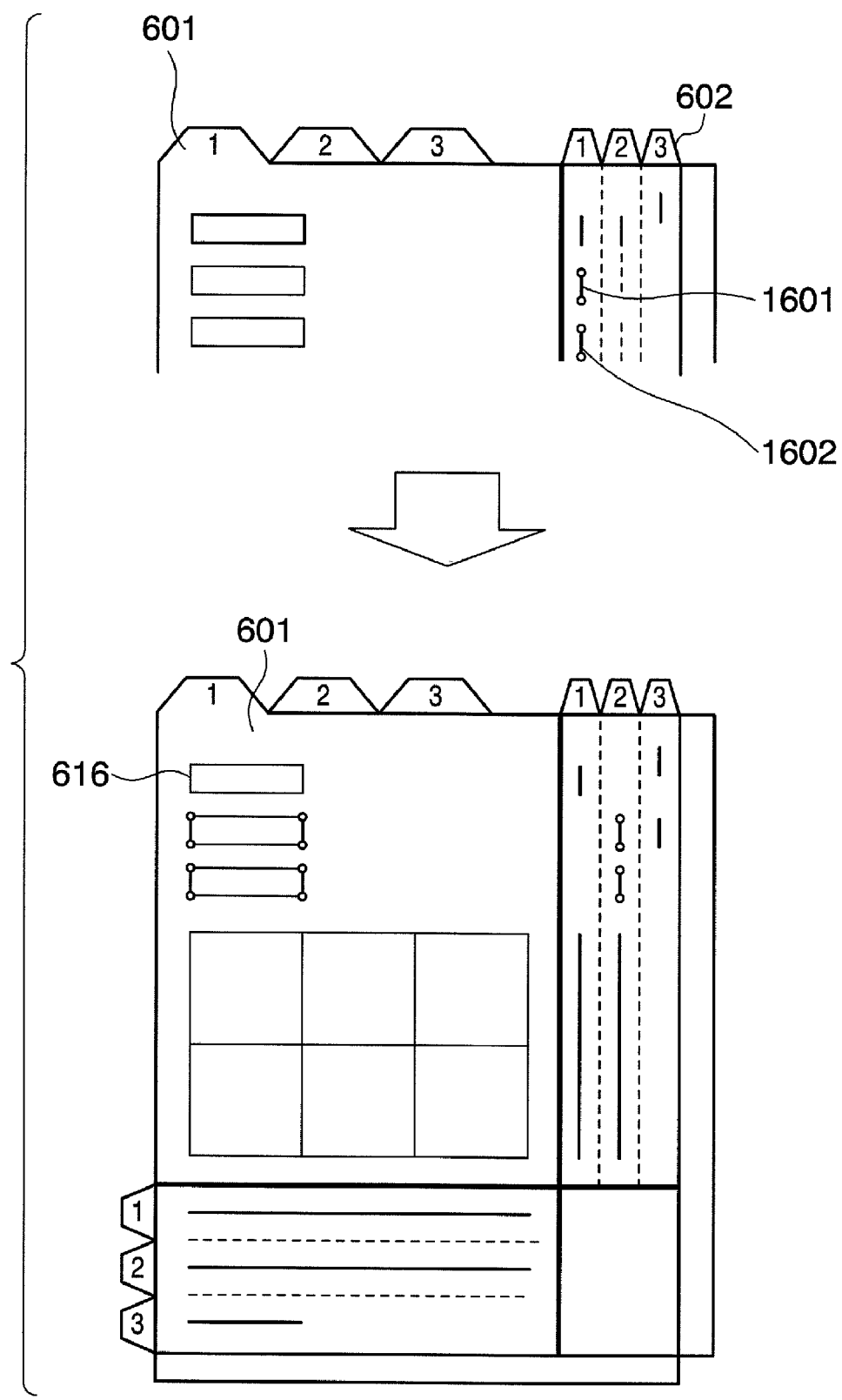
FIG. 16A is a view showing movement of a figure between pages.

FIG. 16A is a view showing an example of moving a figure present in a given page to another page by using the three-directional view 600. Assume that the user is to move figures 1601 and 1602 (projected figures present in the first page) displayed in the horizontal projection pane 602 to the second page without switching the window display. In this case, the user selects the figures 1601 and 1602 in the horizontal projection pane 602. Then, the user clicks the mouse on either figure, drags the figures to a destination horizontal projection pane tab area (tab area of the second page in the first embodiment), and cancels clicking of the mouse to move the figures. In the first embodiment, a figure is moved by mouse dragging, but this function may be implemented by, e.g., selecting a moving destination tab in a dialog box, or operating the cursor key. A figure may also be moved between pages in a fixed vertical direction by dragging the figure while pressing a key (e.g., a shift key). A figure may also be copied between pages by dragging the figure while pressing a key (e.g., a shift key). A figure can also be moved between different pages in the vertical projection pane 603, similar to one in the horizontal projection pane 602.

Even during dragging, the operator can select and operate a tab in the main pane 601 by a predetermined key operation or the like. The main pane can display respective pages containing objects to be moved. When the operator moves an object between pages, the display of the main pane switches to the moving destination page after the movement operation. Consequently, the operator can confirm the page after movement. After moving an object between pages, the operator drags the selected object within the moving destination page, and can continuously move the object between pages and within the moving destination page.

Figure 16B:
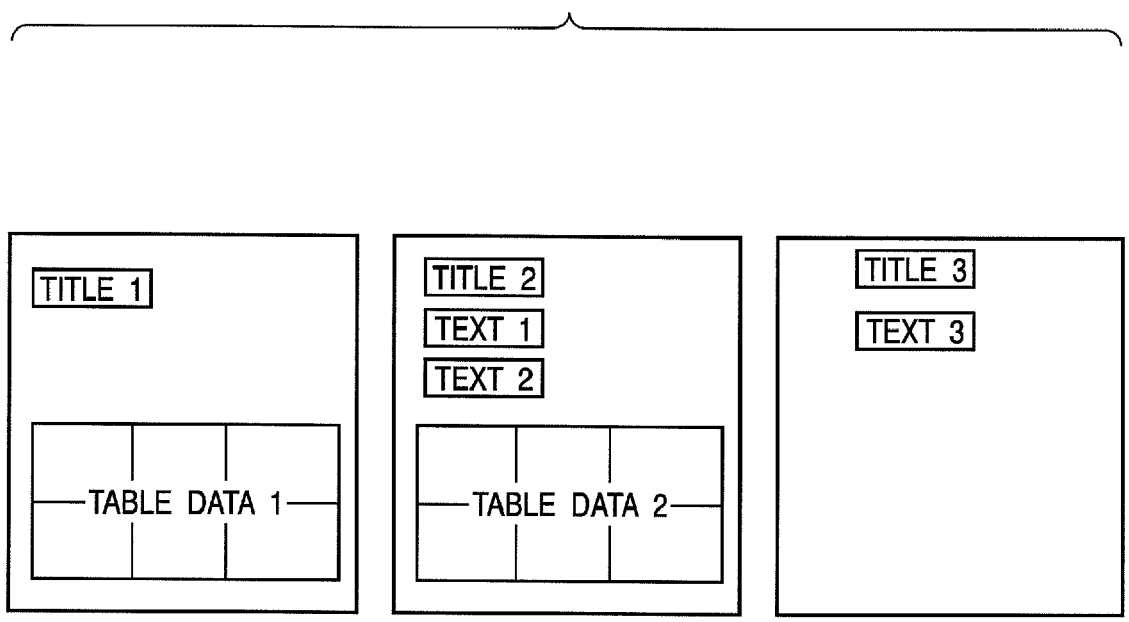
FIG. 16B is a view showing an example of the processing result of moving a figure between pages.

FIG. 16B shows the result of performing the processing in FIG. 16A. By the above-described movement processing, text 1 and text 2 laid out in the first page before movement move to the second page without switching between the pages. This processing allows the operator to achieve inter-page movement processing to move an object selected in the user interface window to a page selected in the user interface window in accordance with one inter-page movement processing instruction by the operator.

FIG. 22 is a flowchart showing processing procedures when the operator selects objects and drags the selected objects. Also in FIG. 22, the processing proceeds by giving attention to a plurality of selected figures sequentially one by one. The word processing application program 403 pays attention to the first selected figure. In step S2201, the word processing application program 403 determines whether the moving source and destination of the selected figure of interest are the same page. If NO in step S2201, the word processing application program 403 rewrites the page number in object information of the selected object interest in each pane-information storage table to the page number of the moving destination in step S2206. If the figure ID is unique in the page, the word processing application program 403 need not rewrite the figure ID. If the figure ID overlaps another one, the word processing application program 403 newly assigns a figure ID. If necessary, the word processing application program 403 sorts the pane-information storage table by the page number. In step S2207, the word processing application program 403 updates page data in accordance with movement of the selected object of interest. More specifically, the word processing application program 403 copies the moved object to the moving destination page and deletes it from the source page. Thereafter, the flow branches to step S2204. The word processing application program 403 updates data values (page value and the like) stored in the pane-information storage tables shown in FIGS. 8A to 8C in accordance with movement of the selected object to the moving destination page.

If the word processing application program 403 determines in step S2201 that the moving source and destination of the selected figure are the same page, the flow branches to step S2202, and the word processing application program 403 calculates X- and Y-coordinate values changed by the moving amount of the selected/dragged figure of interest. The word processing application program 403 updates each pane-information storage table to the calculated coordinate values. For this purpose, the word processing application program 403 obtains, from the OS, the differences between a cursor position immediately before dragging and that upon completion of dragging in the X and Y directions. The word processing application program 403 adds the difference values in the X and Y directions to the X- and Y-coordinate values of the selected object in each pane-information storage table. However, the word processing application program 403 updates only the Y-coordinate value in the horizontal projection pane-information storage table, and only the X-coordinate value in the vertical projection pane-information storage table.

In step S2203, the word processing application program 403 updates page data in which the selected figure of interest is contained, in order to move the selected/dragged figure of interest by the designated moving amount. For the update processing, the word processing application program 403 changes the position of each object in page data to a position corresponding to the X- and Y-coordinate values in the main pane-information storage table.

In step S2204, the word processing application program 403 determines whether all selected objects have received attention. If not all selected objects have received attention, the word processing application program 403 pays attention to a new selected object, and the flow branches to step S2201. After processing all the objects, the flow branches to step S2205, and the word processing application program 403 draws the updated page on the basis of the pane-information storage tables (if necessary, page data). Thereafter, the flow waits for a new input.

By the above procedures, the operator can move a plurality of objects contained in a plurality of pages by the same moving amount in the same direction in the respective pages without switching between the pages.

<Copy Processing>

Figure 17A:
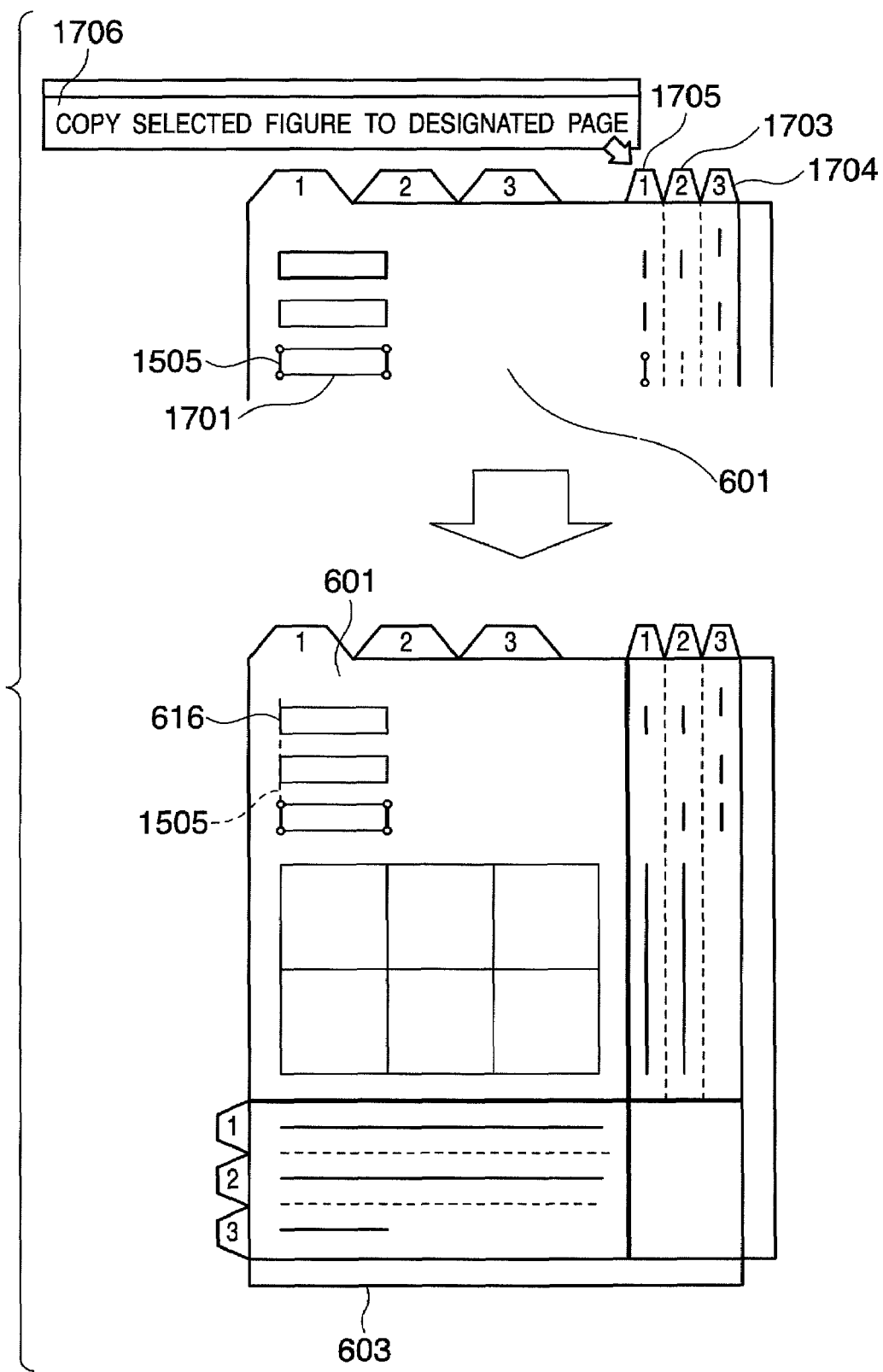
FIG. 17A is a view showing copying of a figure between pages.
Figure 17B:
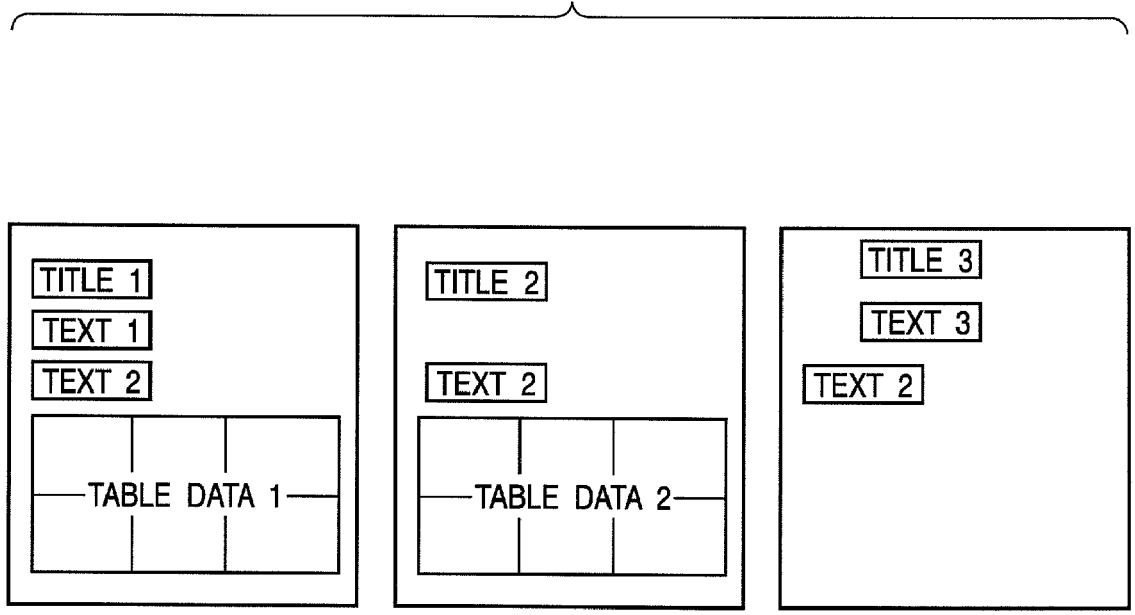
FIG. 17B is a view showing an example of the processing result of copying a figure between pages.

FIG. 17A is a view showing an example of copying a figure present in a given page to other pages by using the three-directional view 600. FIG. 17A assumes a case of copying a figure. 1701 present in the first page to the same position in the second and third pages. In this case, the operator selects the figure 1701 in the main pane 601 (or horizontal projection pane 602). Then, the operator selects tabs 1703 and 1704 as copy destination pages in the horizontal pane 602. The operator right-clicks a horizontal pane tab area 1705 of the copy source page, and selects and executes a command 1706 to copy the selected figure to the designated pages. By the above processing, the word processing application program 403 copies the selected figure to a plurality of pages at once. In the first embodiment, the method of inputting the command 1706 to designate copying is a choice from a context menu displayed by right clicking, but may take any method such as a choice from a main menu or a key operation. FIG. 17B shows the result of copying the figure 1701 in the first page to the same position in the second and third pages. The operator executes the processing shown in FIG. 17A to copy data of text 2 in the first page to the second and third pages. Using the processing in FIG. 17A makes it possible to copy a selected figure to a plurality of pages without switching between the pages. This processing allows the operator to perform copy processing to copy a plurality of objects selected in the user interface window to a plurality of pages selected in the user interface window in accordance with one copy processing instruction by the operator.

FIG. 21 is a flowchart showing the procedures of copy processing. As described above, the operator selects an object to be copied by the procedures in FIG. 19A. The operator also selects copy destination pages by the procedures in FIG. 19B. If the operator selects a copy command in this state, as shown in FIG. 17A, the processing in FIG. 21 starts.

In step S2101, the word processing application program 403 copies, by a designated page count (count indicated by the suffix n of the variable Cn), object information of a selected object of interest registered in each pane-information storage table. In the first embodiment, the position in the copy destination page changes in accordance with an intra-page moving operation of the object moved to the page. In copying between pages, the position in the copy destination page is identical to, e.g., that of the object of interest in the source page. The word processing application program 403 rewrites the page number of the copied object information to one selected as the copy destination. If the figure ID overlaps another one, the word processing application program 403 newly assigns a figure ID. The word processing application program 403 may sort the pane-information storage table by the page number.

In step S2102, the word processing application program 403 copies the selected object of interest contained in page data to the copy destination page.

In step S2103, the word processing application program 403 determines whether all selected objects have been copied. If not all selected objects have been copied, the word processing application program 403 pays attention to a new selected object, and the flow branches to step S2101. If all selected objects have been copied, the word processing application program 403 draws a three-directional view again on the basis of each pane-information storage table updated in step S2104. The display 207 displays the re-drawn three-directional view.

In this manner, the operator can copy a selected object to selected pages by a copy command input by one operation by the operator without switching between the pages. The user interface requires an additional area of only the vertical and horizontal projection panes around a selected page, and can display a large preview.

The first embodiment has described a figure as an object to be edited. However, editing processing can be done by the same procedures as those in the first embodiment even when an object other than a figure, such as an image object, text, or text box, undergoes an editing operation including selection, movement, and copying. That is, an "object", "image", "text", "text box", and the like can replace a "figure" in the first embodiment.

In FIGS. 20A to 22, an object selected in the user interface window as shown in FIG. 6 is edited. The characteristic arrangement of this specification makes it possible to, while displaying the preview image of a page selected in the main pane 601 of FIG. 6, edit an object contained in a page different from that of the displayed preview image.

Figure 24:
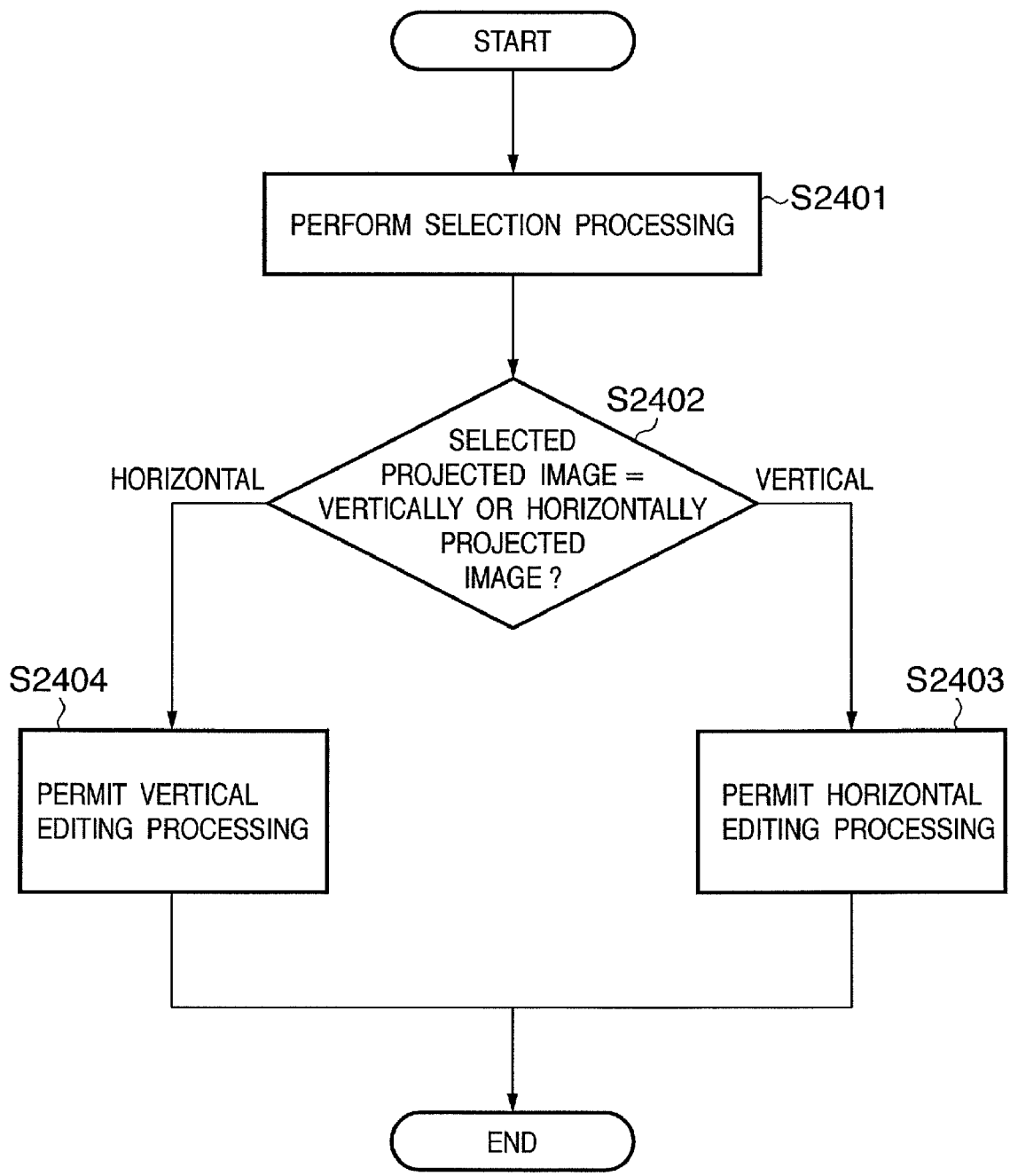
FIG. 24 is a flowchart showing the flow of processing by a word processing application program.

FIG. 24 shows processing executed by the word processing application program 403 on the basis of a selected projected image.

When the operator selects a projected image (S2401), the word processing application program 403 determines whether the selected projected image is a vertically projected image or horizontally projected image (S2402). More specifically, the word processing application program 403 executes the processing in S2402 by looking up the tables shown in FIGS. 8A to 8C and the like and specifying a projected image corresponding to selected position information.

If the word processing application program 403 determines in S2402 that the vertically projected image is selected, it permits horizontal editing processing (S2404). If the word processing application program 403 determines in S2402 that the horizontally projected image is selected, it permits vertical editing processing (S2405). Since the word processing application program 403 permits vertical processing by the above processing in response to selection of, e.g., the horizontally projected figure (synonymous with the horizontally projected image) 613 in FIG. 11, it displays the command box 1110 associated with the vertical direction. Also when the operator selects the vertically projected figure (synonymous with the vertically projected image), the word processing application program 403 displays the command box 1210 to permit horizontal editing processing.

As described above, the first embodiment can provide a user interface capable of improving operability in editing a document of a plurality of pages. The user interface enables intuitive editing work, and the user can efficiently edit figures between pages.

[Modification 1]

Figure 14A:
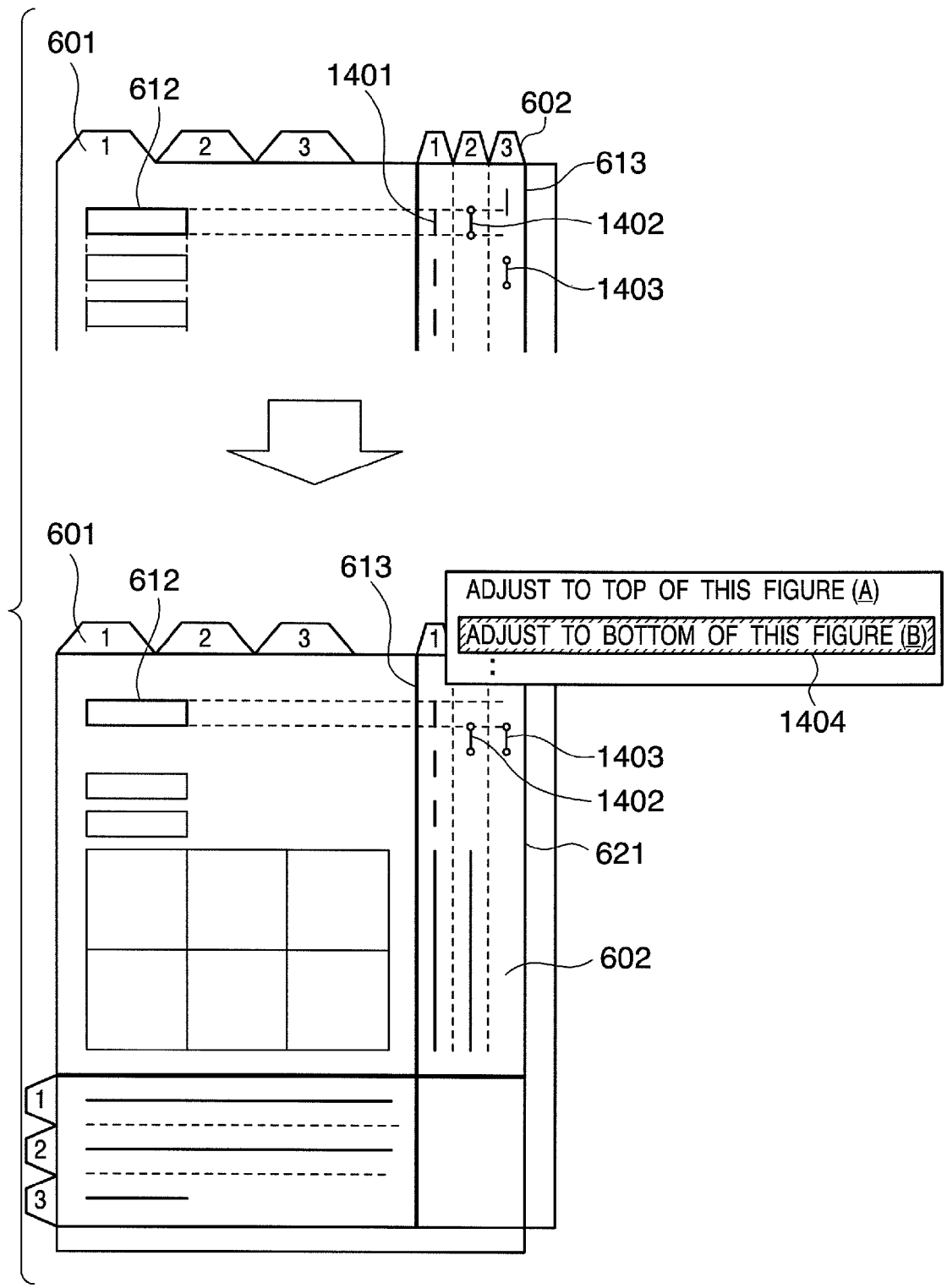
FIG. 14A is a view showing a vertical alignment state.

FIG. 14A shows an example of adjusting the positions of figures in a plurality of pages by using the three-directional view 600. The user is to simultaneously align a figure 1402 present in the second page and a figure 1403 present in the third page to the bottom of a figure 1401 present in the first page. In this case, the user executes processing by right-clicking on the figure 1401 in the horizontal projection pane 602 and executing an "adjust to the bottom of the figure" command 1404. As a result of alignment, the tops of the figures 1402 and 1403 are aligned to the bottom of the figure 1401. FIG. 14B shows the result of alignment. As a result of performing the processing in FIG. 14A, the user can align the top of text 2 in the second page and that of text 3 in the third page to the bottom of title 1 in the first page. This processing is different from the flow in the first embodiment in the process of step S1903 to check whether a plurality of figures are selected and the process of step S1904 to validate a command. Modification 1 can omit these two processes because alignment can be done using an unselected figure as a reference. The remaining processes such as storage of information in the pane-information storage table are the same as those in the first embodiment.

[Modification 2]

In the first embodiment and modification 1, when figure objects projected in each of the horizontal and vertical projection panes overlap each other in the projection direction, projected objects also overlap each other. For example, the object 612 and an object 615 overlap each other in the vertical direction, as shown in FIG. 6. Thus, the vertical projection pane displays the vertically projected image 614 of the overlapping objects. It is difficult to determine, from the vertically projected image 614, that the vertically projected image 614 contains the two projected objects.

Figure 23:
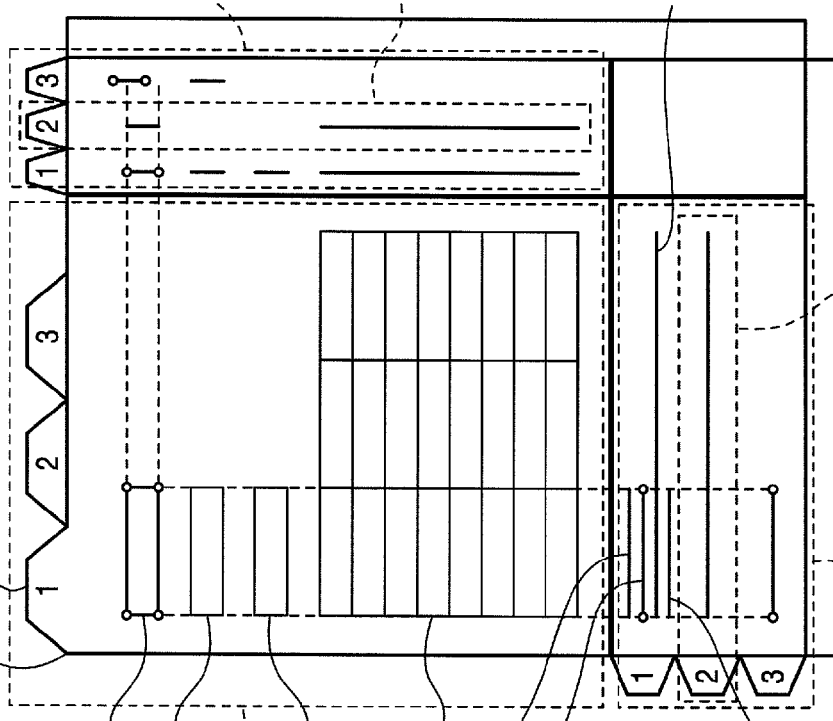
FIG. 23 is a view showing another example of the user interface for editing and displaying a document.

To solve this problem, it is also possible to display the horizontally and vertically projected images of overlapping objects in the horizontal and vertical projection panes, respectively. In this case, objects overlapping in the projection direction are displayed on rows or columns shifted from each other. FIG. 23 shows an example of this layout. The vertical projection pane for the first page displays a vertically projected image 2301 of the object 612, a vertically projected image 2303 of the object 616, a vertically projected image 2304 of the object 617, and a vertically projected image 2302 of the object 615 at positions vertically shifted from each other. This also applies to the horizontal pane.

To the contrary, the user may select one projected image to select a plurality of objects corresponding to the position and size of the projected image. For example, the objects 612, 616, and 617 match each other in position and size in the vertical direction, as shown in FIG. 6. In this state, the user selects the segment 614 to select the objects 612, 616, and 617. By selecting one projected image, the user can also edit a plurality of objects.

In this fashion, when the vertical and horizontal projection panes for one page have slots for parallel-displaying the projected images of a plurality of objects, even images displayed in the vertical and horizontal projection panes allow the user to identify respective objects. The degree of freedom in selecting an object of a page not displayed in the main pane increases, and the operability further improves.

[Modification 3]

In the first embodiment, the horizontal and vertical projection panes display the projected images of all pages contained in document data. In modification 3, however, the horizontal and vertical projection panes display the projected images of pages separately selected from document data. In this case, the operator is prompted to designate the range of pages to be displayed in the user interface before the procedures in FIG. 18. According to the procedures in FIG. 18, the three-directional view displays only pages within the selected range. With this setting, the user interface window can display only limited pages to be edited in a document having many pages. When the document data file has a hierarchical structure, data can be selected for each node. For example, combining document data into one node every break facilitates selecting an edit target.

Even when creating, e.g., a continuous business form as described above, the user can easily edit a field figure contained in each page by executing the above processing by the word processing application program 403, thus improving operability.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-265938 filed on Sep. 13, 2005, which is hereby incorporated by reference herein in its entirety.

What is claimed is:

1. A text editing apparatus which edits document data of pages containing objects, comprising:
    a processor;
    a memory;
    a display unit adapted to display, on a display, a user interface window including a preview image of a page selected from the document data and, for a plurality of pages contained in the document data:
        a horizontal projection pane that displays a plurality of horizontally projected images obtained by projecting objects contained in the respective pages in a horizontal direction of the pages, and
        a vertical projection pane that displays a plurality of vertically projected images obtained by projecting the objects in a vertical direction of the pages;
    a selection unit adapted to select one or a plurality of horizontally projected images or vertically projected images displayed by said horizontal or vertical projection panes, and thereby selecting objects corresponding to the selected projected images; and
    an editing processing unit adapted to execute editing processing for the selected objects in the user interface window,
    wherein said editing processing unit executes the editing processing for an object which is contained in a page different from the page of the preview image while displaying the preview image.

2. The apparatus according to claim 1, further comprising an analysis unit adapted to analyze a position and size of an object contained in each page of the document data,
    wherein said display unit creates, for each of the preview image, the horizontally projected image, and the vertically projected image in accordance with an analysis result by said analysis unit, object information including a page in which an object included in the document data is contained, a position in the page, a size, and information representing whether an operator selects the object, and displays the user interface window on the basis of the object information.

3. The apparatus according to claim 1, wherein said editing processing unit performs alignment processing to align a plurality of objects, which are selected in the user interface window and contained in different pages, by using an object selected by an operator as a reference in accordance with one alignment processing instruction by the operator.

4. The apparatus according to claim 1, wherein said editing processing unit performs intra-page movement processing to move a plurality of objects, which are selected in the user interface window and contained in different pages, within the respective pages in accordance with one intra-page movement processing instruction by an operator.

5. The apparatus according to claim 1, wherein said editing processing unit performs inter-page movement processing to move an object selected in the user interface window to a page different from a page containing the object in the user interface window in accordance with one inter-page movement processing instruction by an operator.

6. The apparatus according to claim 1, wherein said editing processing unit performs copy processing to copy an object selected in the user interface window to a page different from a page containing the object in the user interface window in accordance with one copy processing instruction by an operator.

7. The apparatus according to claim 1, wherein when said selection unit selects a horizontally projected image, said editing processing unit permits vertical editing processing for an object corresponding to the horizontally projected image, and when said selection unit selects a vertically projected image, permits horizontal editing processing for an object corresponding to the vertically projected image.

8. A text editing method of editing document data of pages containing objects, comprising:
    a display step of displaying, on a display unit, a user interface window including a preview image of a page selected from the document data and, for a plurality of pages contained in the document data:
        a horizontal projection pane that displays a plurality of horizontally projected images obtained by projecting objects contained in the respective pages in a horizontal direction of the pages, and
        a vertical projection pane that displays a plurality of vertically projected images obtained by projecting the objects in a vertical direction of the pages;
    a selection step of selecting one or a plurality of horizontally projected images or vertically projected images displayed by said horizontal or vertical projection panes, and thereby selecting objects corresponding to the selected projected images; and
    an editing processing step of executing editing processing for the selected objects in the user interface window,
    wherein, in the editing processing step, the editing processing is executed for an object which is contained in a page different from the page of the preview image while displaying the preview image.

9. The method according to claim 8, further comprising an analysis step of analyzing a position and size of an object contained in each page of the document data,
    wherein in the display step, object information including a page in which an object included in the document data is contained, a position in the page, a size, and information representing whether an operator selects the object is created for each of the preview image, the horizontally projected image, and the vertically projected image in accordance with an analysis result in the analysis step, and the user interface window is displayed on the basis of the object information.

10. The method according to claim 8, wherein in the editing processing step, alignment processing is performed to align a plurality of objects, which are selected in the user interface window and contained in different pages, by using an object selected by an operator as a reference in accordance with one alignment processing instruction by the operator.

11. The method according to claim 8, wherein in the editing processing step, intra-page movement processing is performed to move a plurality of objects, which are selected in the user interface window and contained in different pages, within the respective pages in accordance with one intra-page movement processing instruction by an operator.

12. The method according to claim 8, wherein in the editing processing step, inter-page movement processing is performed to move an object selected in the user interface window to a page different from a page containing the object in the user interface window in accordance with one inter-page movement processing instruction by an operator.

13. The method according to claim 8, wherein in the editing processing step, copy processing is performed to copy an object selected in the user interface window to a page different from a page containing the object in the user interface window in accordance with one copy processing instruction by an operator.

14. The method according to claim 8, wherein in the editing processing step, when a horizontally projected image is selected in the selection step, vertical editing processing is permitted for an object corresponding to the horizontally projected image, and when a vertically projected image is selected in the selection step, horizontal editing processing is permitted for an object corresponding to the vertically projected image.

15. A program recorded on a computer-readable recording medium in order to edit document data of pages containing objects, comprising:
  a code for a display step of a displaying, on a display unit, a user interface window including a preview image of a page selected from the document data and, for a plurality of pages contained in the document data:
    a horizontal projection pane that displays a plurality of horizontally projected images obtained by projecting objects contained in the respective pages in a horizontal direction of the pages, and
    a vertical projection pane that displays a plurality of vertically projected images obtained by projecting the objects in a vertical direction of the pages;
  a code for a selection step of selecting one or a plurality of horizontally projected images or vertically projected images displayed by said horizontal or vertical projection panes, and thereby selecting objects corresponding to the selected projected images; and
  a code for an editing processing step of executing editing processing for the selected objects in the user interface window,
  wherein in the editing processing step, the editing processing is executed for an object which is contained in a page different from the page of the preview image while displaying the preview image.

16. The program according to claim 15, further comprising a code for an analysis step of analyzing a position and size of an object contained in each page of the document data,
  wherein in the display step, object information including a page in which an object included in the document data is contained, a position in the page, a size, and information representing whether an operator selects the object is created for each of the preview image, the horizontally projected image, and the vertically projected image in accordance with an analysis result in the analysis step, and the user interface window is displayed on the basis of the object information.

17. The program according to claim 15, wherein in the editing processing step, alignment processing is performed to align a plurality of objects, which are selected in the user interface window and contained in different pages, by using an object selected by an operator as a reference in accordance with one alignment processing instruction by the operator.

18. The program according to claim 15, wherein in the editing processing step, intra-page movement processing is performed to move a plurality of objects, which are selected in the user interface window and contained in different pages, within the respective pages in accordance with one intra-page movement processing instruction by an operator.

19. The program according to claim 15, wherein in the editing processing step, inter-page movement processing is performed to move an object selected in the user interface window to a page different from a page containing the object in the user interface window in accordance with one inter-page movement processing instruction by an operator.

20. The program according to claim 15, wherein in the editing processing step, copy processing is performed to copy an object selected in the user interface window to a page different from a page containing the object in the user interface window in accordance with one copy processing instruction by an operator.

21. The program according to claim 15, wherein in the editing processing step, when a horizontally projected image is selected in the selection step, vertical editing processing is permitted for an object corresponding to the horizontally projected image, and when a vertically projected image is selected in the selection step, horizontal editing processing is permitted for an object corresponding to the vertically projected image.

* * * * *